US010601003B2

(12) United States Patent
Yang et al.

(10) Patent No.: US 10,601,003 B2
(45) Date of Patent: Mar. 24, 2020

(54) BATTERY MODULE AND METHOD OF ASSEMBLING THE BATTERY MODULE

(71) Applicant: LG Chem, Ltd., Seoul (KR)

(72) Inventors: Heekook Yang, Troy, MI (US); Robert Merriman, Lynn Township, MI (US)

(73) Assignee: LG Chem, Ltd., Seoul (KR)

( * ) Notice: Subject to any disclaimer, the term of this patent is extended or adjusted under 35 U.S.C. 154(b) by 278 days.

(21) Appl. No.: 15/797,333

(22) Filed: Oct. 30, 2017

(65) Prior Publication Data

US 2019/0131596 A1    May 2, 2019

(51) Int. Cl.
| | | |
|---|---|---|
| *H01M 2/10* | (2006.01) | |
| *H01M 2/06* | (2006.01) | |
| *H01M 10/04* | (2006.01) | |
| *H01M 2/02* | (2006.01) | |
| *H01M 2/04* | (2006.01) | |
| *H01M 2/20* | (2006.01) | |
| *H01M 10/6554* | (2014.01) | |

(52) U.S. Cl.
CPC ....... *H01M 2/1016* (2013.01); *H01M 2/0285* (2013.01); *H01M 2/04* (2013.01); *H01M 2/06* (2013.01); *H01M 2/202* (2013.01); *H01M 10/04* (2013.01); *H01M 10/6554* (2015.04)

(58) Field of Classification Search
CPC .......... H01M 2/106; H01M 2/06; H01M 2/04; H01M 2/0285; H01M 2/202; H01M 10/04

See application file for complete search history.

(56) References Cited

U.S. PATENT DOCUMENTS

| | | | |
|---|---|---|---|
| 8,076,020 B2 * | 12/2011 | Goto | H01M 2/1077 320/112 |
| 8,747,490 B2 | 6/2014 | Amagai et al. | |
| 8,920,955 B1 | 12/2014 | Chuang et al. | |
| 9,605,914 B2 | 3/2017 | Yum et al. | |
| 10,355,329 B2 * | 7/2019 | Isshiki | B60L 50/64 |
| 2008/0090137 A1 * | 4/2008 | Buck | H01M 2/1077 429/120 |
| 2013/0022859 A1 | 1/2013 | Lim | |

(Continued)

FOREIGN PATENT DOCUMENTS

| | | |
|---|---|---|
| KR | 20130011740 A | 1/2013 |
| KR | 101293211 B1 | 8/2013 |

(Continued)

*Primary Examiner* — Robert S Jones
*Assistant Examiner* — Claire L Roe
(74) *Attorney, Agent, or Firm* — Buckert Patent & Trademark Law Firm PC; John F. Buckert

(57) ABSTRACT

A battery module having first and second battery cells, a u-shaped frame member, a thermally conductive layer, a top cover plate, and first and second side cover plates is provided. The u-shaped frame member has a bottom wall and first and second side walls coupled to the bottom wall that extend upwardly from the bottom wall. The u-shaped frame member defines an interior space that holds the first and second battery cells therein. The first and second battery cells are disposed directly on the thermally conductive layer. The top cover plate is coupled to the first and second side walls to enclose a top open region of the u-shaped frame member. The first side cover plate that is coupled to the top cover plate and the bottom wall to enclose a first side open region of the u-shaped frame member.

13 Claims, 23 Drawing Sheets

(56) References Cited

U.S. PATENT DOCUMENTS

| | | | |
|---|---|---|---|
| 2013/0216884 A1* | 8/2013 | Takasaki | H01M 2/1077 |
| | | | 429/99 |
| 2013/0244066 A1 | 9/2013 | Kang et al. | |
| 2014/0023906 A1* | 1/2014 | Hashimoto | H01M 2/1077 |
| | | | 429/120 |
| 2015/0132622 A1* | 5/2015 | Gohl | H01M 2/0434 |
| | | | 429/90 |
| 2016/0020446 A1* | 1/2016 | Zheng | H01M 2/1094 |
| | | | 429/82 |
| 2017/0176108 A1 | 6/2017 | Palanchon et al. | |
| 2017/0237132 A1 | 8/2017 | Merriman et al. | |
| 2018/0019508 A1 | 1/2018 | Lee et al. | |
| 2018/0175464 A1 | 6/2018 | Kim et al. | |

FOREIGN PATENT DOCUMENTS

| | | |
|---|---|---|
| KR | 20160115582 A | 10/2016 |
| KR | 20170037125 A | 4/2017 |

* cited by examiner

BATTERY MODULE AND METHOD OF ASSEMBLING THE BATTERY MODULE

BACKGROUND

The inventors herein have recognized a need for an improved battery module that can be more easily assembled.

SUMMARY

A battery module in accordance with an exemplary embodiment is provided. The battery module includes a first battery cell having a first rectangular housing with first and second major side surfaces, a first bottom end portion, and a first top end portion. The battery module further includes a second battery cell having a second rectangular housing with third and fourth major side surfaces, a second bottom end portion, and a second top end portion. The first and second battery cells are stacked on one another such that the second major side surface of the first battery cell is disposed against the third major side surface of the second battery cell. The battery module further includes a u-shaped frame member having a bottom wall and first and second side walls coupled to the bottom wall and extending upwardly from the bottom wall. The u-shaped frame member defines an interior space between the bottom wall and the first and second side walls that is sized and shaped to hold the first and second battery cells therein. The battery module further includes a thermally conductive layer that is disposed on the bottom wall and communicating with the interior space. The first and second battery cells are disposed in the interior space such that the first bottom end portion of the first battery cell and the second bottom end portion of the second battery cell are disposed directly on the thermally conductive layer, and the first, second, third, and fourth major side surfaces are disposed substantially perpendicular to the bottom wall. The battery module further includes a top cover plate that is coupled to the first and second side walls of the u-shaped frame member to enclose a top open region of the u-shaped frame member. The battery module further includes a first side cover plate that is coupled to the top cover plate and the bottom wall to enclose a first side open region of the u-shaped frame member. The battery module further includes a second side cover plate that is coupled to the top cover plate and the bottom wall to enclose a second side open region of the u-shaped frame member.

A method of assembling a battery module in accordance with another exemplary embodiment is provided. The method includes providing first and second battery cells. The first battery cell has a first rectangular housing with first and second major side surfaces, a first bottom end portion, and a first top end portion. The second battery cell has a second rectangular housing with third and fourth major side surfaces, a second bottom end portion, and a second top end portion. The first and second battery cells are stacked on one another such that the second major side surface of the first battery cell is disposed against the third major side surface of the second battery cell. The method further includes providing a u-shaped frame member having a bottom wall and first and second side walls coupled to the bottom wall and extending upwardly from the bottom wall. The u-shaped frame member defines an interior space between the bottom wall and the first and second side walls. The method further includes disposing a thermally conductive layer on the bottom wall such that the thermally conductive layer communicates with the interior space. The method further includes disposing the first and second battery cells in the interior space such that the first bottom end portion of the first battery cell and the second bottom end portion of the second battery cell are disposed directly on the thermally conductive layer, and the first, second, third and fourth major side surfaces are disposed substantially perpendicular to the bottom wall. The method further includes coupling a top cover plate to the first and second side walls of the u-shaped frame member to enclose a top open region of the u-shaped frame member. The method further includes coupling a first side cover plate to the top cover plate and the bottom wall to enclose a first side open region of the u-shaped frame member. The method further includes coupling a second side cover plate to the top cover plate and the bottom wall to enclose a second side open region of the u-shaped frame member.

DETAILED DESCRIPTION

Figure 1:
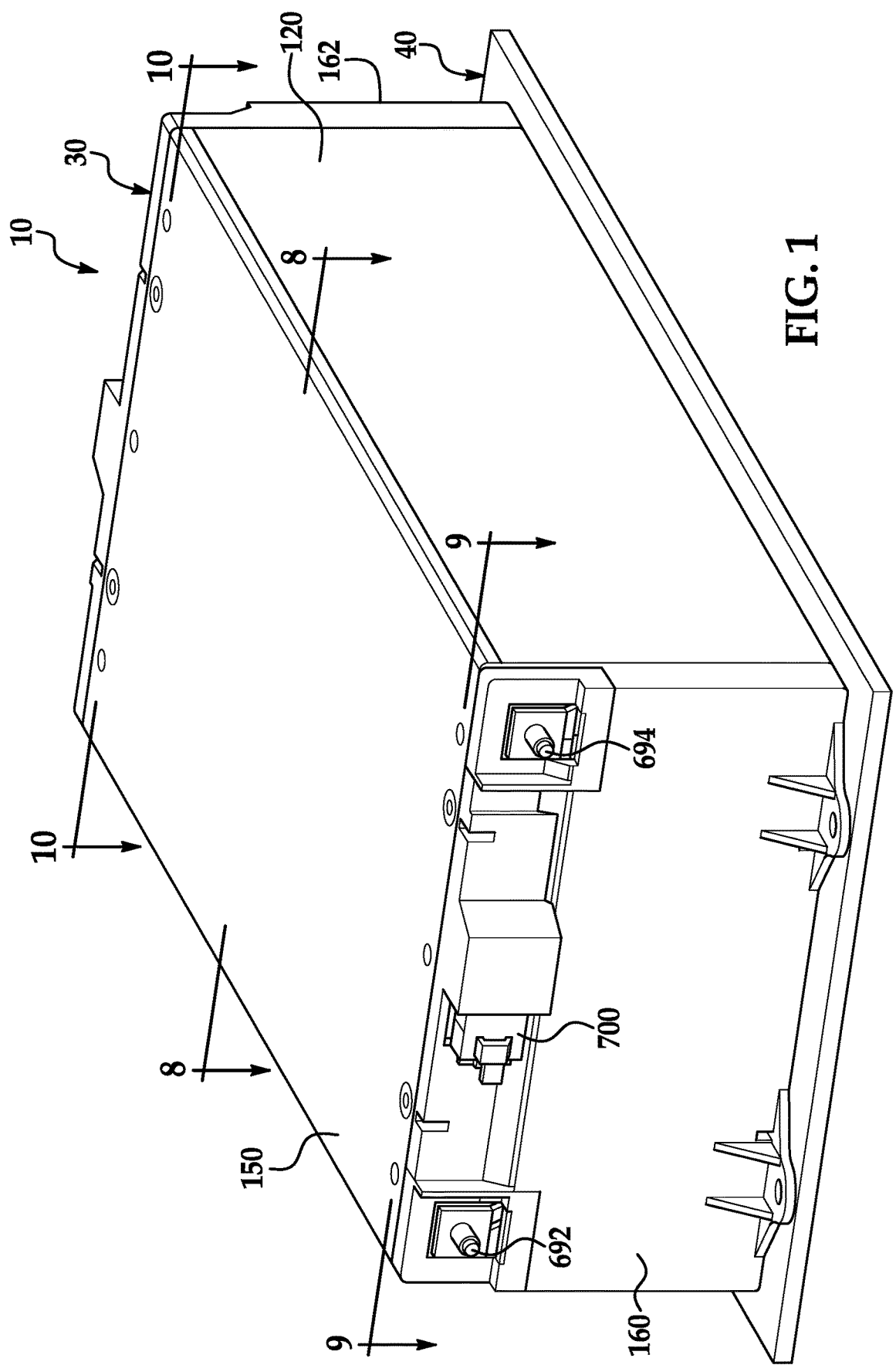
FIG. 1 is a schematic of a battery system having a battery module in accordance with an exemplary embodiment, and a cooling plate.

Referring to FIGS. 1-4, a battery system 10 is provided. The battery system 10 includes a battery module 30 in accordance with exemplary embodiment, and a cooling plate 40. An advantage of the battery module 30 is that the battery module 30 can be more easily assembled than other battery modules because the battery module 30 utilizes a U-shaped frame member 128 can easily receive battery cells therein while assembling the battery module 30.

Referring to FIGS. 1, 4, 8 and 34, the battery module 30 includes battery cells 50, 52, 54, 56, 58, 60, 62, 64, 66, 68, 70, 72, 74, 76, 78, 80, foam layers 90, 92, 94, 96, 98, 100, 102, 104, 106, a u-shaped frame member 120, a thermally conductive layer 130, interconnect assemblies 140, 142, a top cover plate 150, side cover plates 160, 162, and bolts 164, 165, 166, 167, 168, 169, 170, 171.

Figure 8:
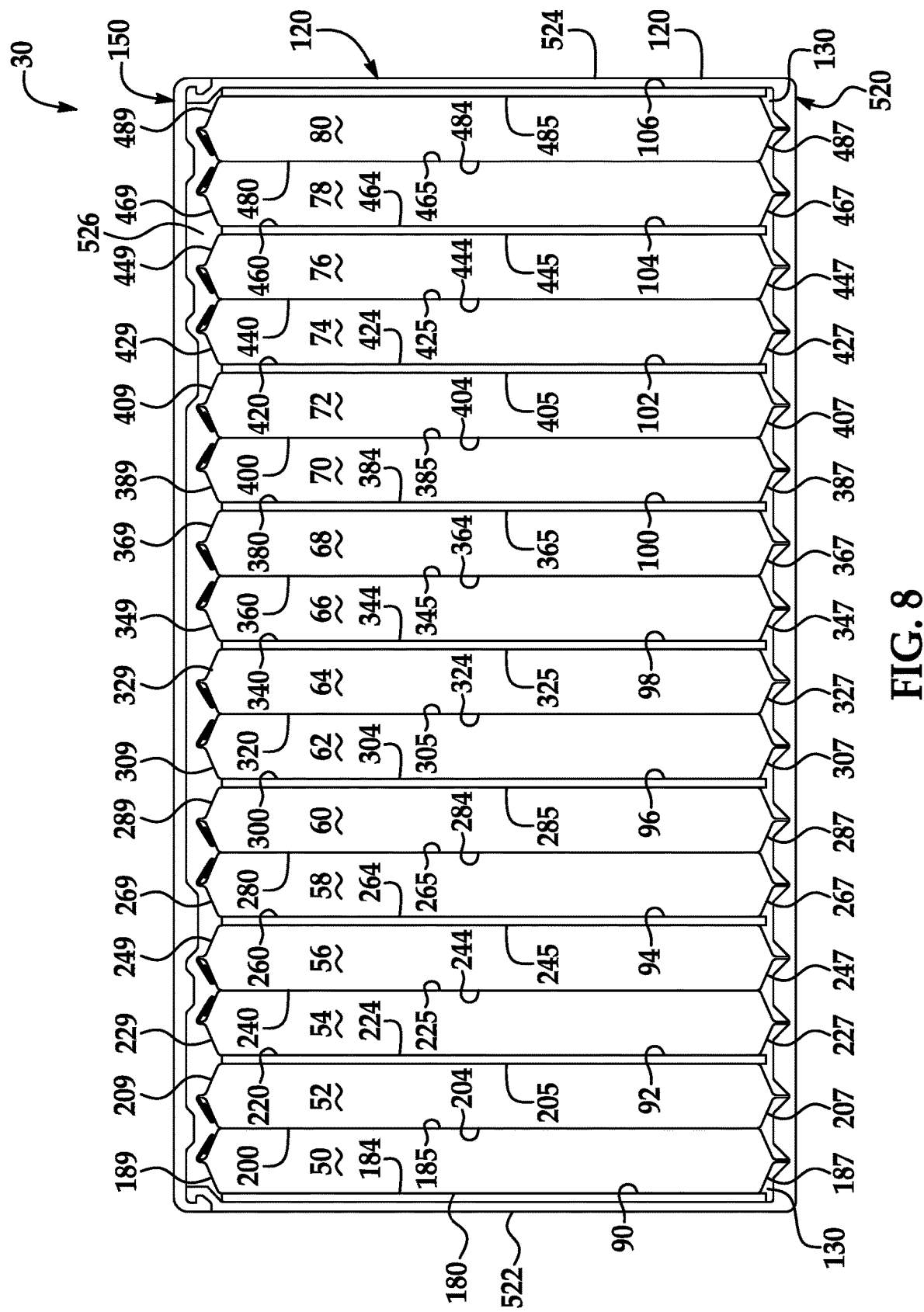
FIG. 8 is a cross-sectional view of the battery module of FIG. 1 taken along lines 8-8.

Referring to FIG. 8, the battery cell 50 includes a rectangular housing 180 and first and second electrical terminals extending outwardly from the rectangular housing 180. The rectangular housing 180 includes major side surfaces 184, 185, a bottom end portion 187, and a top end portion 189. The major side surface 184 is disposed between the bottom end portion 187 and the top end portion 189. Further, the major side surface 185 extends substantially parallel to the major side surface 184 and is disposed between the bottom end portion 187 and the top end portion 189. The major side surface 184 of the battery cell 50 is disposed against a foam layer 90. The foam layer 90 is disposed between the major side surface 184 and a first side wall 522 of the u-shaped frame member 120. The major side surface 185 the battery cell 50 is disposed against a major side surface 204 of the battery cell 52.

The battery cell 52 includes a rectangular housing 200 and first and second electrical terminals extending outwardly from the rectangular housing 200. The rectangular housing 200 includes major side surfaces 204, 205, a bottom end portion 207, and a top end portion 209. The major side surface 204 is disposed between the bottom end portion 207 and the top end portion 209. Further, the major side surface 205 extends substantially parallel to the major side surface 204 and is disposed between the bottom end portion 207 and the top end portion 209. The major side surface 204 of the battery cell 52 is disposed against the major side surface 185 of the battery cell 50. The major side surface 205 the battery cell 52 is disposed against the foam layer 92.

The battery cell 54 includes a rectangular housing 220 and first and second electrical terminals extending outwardly from the rectangular housing 220. The rectangular housing 220 includes major side surfaces 224, 225, a bottom end portion 227, and a top end portion 229. The major side surface 224 is disposed between the bottom end portion 227 and the top end portion 229. Further, the major side surface 225 extends substantially parallel to the major side surface 224 and is disposed between the bottom end portion 227 and the top end portion 229. The major side surface 224 of the battery cell 54 is disposed against the foam layer 92. The major side surface 225 the battery cell 54 is disposed against the major side surface 244 of the battery cell 56.

The battery cell 56 includes a rectangular housing 240 and first and second electrical terminals extending outwardly from the rectangular housing 240. The rectangular housing 240 includes major side surfaces 244, 245, a bottom end portion 247, and a top end portion 249. The major side surface 244 is disposed between the bottom end portion 247 and the top end portion 249. Further, the major side surface 245 extends substantially parallel to the major side surface 244 and is disposed between the bottom end portion 247 and the top end portion 249. The major side surface 244 of the battery cell 56 is disposed against the major side surface 225 of the battery cell 54. The major side surface 245 the battery cell 56 is disposed against the foam layer 94.

The battery cell 58 includes a rectangular housing 260 and first and second electrical terminals extending outwardly from the rectangular housing 260. The rectangular housing 260 includes major side surfaces 264, 265, a bottom end portion 267, and a top end portion 269. The major side surface 264 is disposed between the bottom end portion 267 and the top end portion 269. Further, the major side surface 265 extends substantially parallel to the major side surface 264 and is disposed between the bottom end portion 267 and the top end portion 269. The major side surface 264 of the battery cell 58 is disposed against the foam layer 94. The major side surface 265 the battery cell 58 is disposed against the major side surface 284 of the battery cell 60.

The battery cell 60 includes a rectangular housing 280 and first and second electrical terminals extending outwardly from the rectangular housing 280. The rectangular housing 280 includes major side surfaces 284, 285, a bottom end portion 287, and a top end portion 289. The major side surface 284 is disposed between the bottom end portion 287 and the top end portion 289. Further, the major side surface 285 extends substantially parallel to the major side surface 284 and is disposed between the bottom end portion 287 and the top end portion 289. The major side surface 284 of the battery cell 60 is disposed against the major side surface 265 of the battery cell 58. The major side surface 285 the battery cell 60 is disposed against the foam layer 96.

The battery cell 62 includes a rectangular housing 300 and first and second electrical terminals extending outwardly from the rectangular housing 300. The rectangular housing 300 includes major side surfaces 304, 305, a bottom end portion 307, and a top end portion 309. The major side surface 304 is disposed between the bottom end portion 307 and the top end portion 309. Further, the major side surface 305 extends substantially parallel to the major side surface 304 and is disposed between the bottom end portion 307 and the top end portion 309. The major side surface 304 of the battery cell 62 is disposed against the foam layer 96. The major side surface 305 the battery cell 62 is disposed against the major side surface 324 of the battery cell 64.

The battery cell 64 includes a rectangular housing 320 and first and second electrical terminals extending outwardly from the rectangular housing 320. The rectangular housing 320 includes major side surfaces 324, 325, a bottom end portion 327, and a top end portion 329. The major side surface 324 is disposed between the bottom end portion 327 and the top end portion 329. Further, the major side surface 325 extends substantially parallel to the major side surface 324 and is disposed between the bottom end portion 327 and the top end portion 329. The major side surface 324 of the battery cell 64 is disposed against the major side surface 305 the battery cell 62. The major side surface 325 the battery cell 64 is disposed against the foam layer 98.

The battery cell 66 includes a rectangular housing 340 and first and second electrical terminals extending outwardly from the rectangular housing 340. The rectangular housing 340 includes major side surfaces 344, 345, a bottom end portion 347, and a top end portion 349. The major side surface 344 is disposed between the bottom end portion 347 and the top end portion 349. Further, the major side surface 345 extends substantially parallel to the major side surface 344 and is disposed between the bottom end portion 347 and the top end portion 349. The major side surface 344 of the battery cell 66 is disposed against the foam layer 98. The major side surface 345 the battery cell 66 is disposed against the major side surface 364 of the battery cell 68.

The battery cell 68 includes a rectangular housing 360 and first and second electrical terminals extending outwardly from the rectangular housing 360. The rectangular housing 360 includes major side surfaces 364, 365, a bottom end portion 367, and a top end portion 369. The major side surface 364 is disposed between the bottom end portion 367 and the top end portion 369. Further, the major side surface 365 extends substantially parallel to the major side surface 364 and is disposed between the bottom end portion 367 and the top end portion 369. The major side surface 364 of the battery cell 68 is disposed against the major side surface 345 of the battery cell 66. The major side surface 365 the battery cell 68 is disposed against the foam layer 100.

The battery cell 70 includes a rectangular housing 380 and first and second electrical terminals extending outwardly from the rectangular housing 380. The rectangular housing 380 includes major side surfaces 384, 385, a bottom end portion 387, and a top end portion 389. The major side surface 384 is disposed between the bottom end portion 387 and the top end portion 389. Further, the major side surface 385 extends substantially parallel to the major side surface 384 and is disposed between the bottom end portion 387 and the top end portion 389. The major side surface 384 of the battery cell 70 is disposed against the foam layer 100. The major side surface 385 the battery cell 70 is disposed against the major side surface 404 of the battery cell 72.

The battery cell 72 includes a rectangular housing 400 and first and second electrical terminals extending outwardly from the rectangular housing 400. The rectangular housing 400 includes major side surfaces 404, 405, a bottom end portion 407, and a top end portion 409. The major side surface 404 is disposed between the bottom end portion 407 and the top end portion 409. Further, the major side surface 405 extends substantially parallel to the major side surface 404 and is disposed between the bottom end portion 407 and the top end portion 409. The major side surface 404 of the battery cell 72 is disposed against the major side surface 385 of the battery cell 70. The major side surface 405 the battery cell 72 is disposed against the foam layer 102.

The battery cell 74 includes a rectangular housing 420 and first and second electrical terminals extending outwardly from the rectangular housing 420. The rectangular housing 420 includes major side surfaces 424, 425, a bottom end portion 427, and a top end portion 429. The major side surface 424 is disposed between the bottom end portion 427 and the top end portion 429. Further, the major side surface 425 extends substantially parallel to the major side surface 424 and is disposed between the bottom end portion 427 and the top end portion 429. The major side surface 424 of the battery cell 74 is disposed against the foam layer 102. The major side surface 425 the battery cell 74 is disposed against the major side surface 444 of the battery cell 76.

The battery cell 76 includes a rectangular housing 440 and first and second electrical terminals extending outwardly from the rectangular housing 440. The rectangular housing 440 includes major side surfaces 444, 445, a bottom end portion 447, and a top end portion 449. The major side surface 444 is disposed between the bottom end portion 447 and the top end portion 449. Further, the major side surface 445 extends substantially parallel to the major side surface 444 and is disposed between the bottom end portion 447 and the top end portion 449. The major side surface 444 of the battery cell 76 is disposed against the major side surface 425 of the battery cell 74. The major side surface 445 the battery cell 76 is disposed against the foam layer 104.

The battery cell 78 includes a rectangular housing 460 and first and second electrical terminals extending outwardly from the rectangular housing 460. The rectangular housing 460 includes major side surfaces 464, 465, a bottom end portion 467, and a top end portion 469. The major side surface 464 is disposed between the bottom end portion 467 and the top end portion 469. Further, the major side surface 465 extends substantially parallel to the major side surface 464 and is disposed between the bottom end portion 467 and the top end portion 469. The major side surface 464 of the battery cell 78 is disposed against the foam layer 104. The major side surface 465 the battery cell 78 is disposed against the major side surface 484 of the battery cell 80.

The battery cell 80 includes a rectangular housing 480 and first and second electrical terminals extending outwardly from the rectangular housing 480. The rectangular housing 480 includes major side surfaces 484, 485, a bottom end portion 487, and a top end portion 489. The major side surface 484 is disposed between the bottom end portion 487 and the top end portion 489. Further, the major side surface 485 extends substantially parallel to the major side surface 484 and is disposed between the bottom end portion 487 and the top end portion 489. The major side surface 484 of the battery cell 80 is disposed against the major side surface 465 of the battery cell 78. The major side surface 485 the battery cell 80 is disposed against the foam layer 106. The foam layer 106 is disposed between the battery cell 80 and the second side wall 524 of the u-shaped frame member 120.

Referring to FIGS. 8, 9, 13 and 14, the u-shaped frame member 120 is provided to hold the battery cells 50-80 and the foam layers 90-106 therein. The u-shaped frame member 120 includes a bottom wall 520 and first and second side walls 522, 524 coupled to the bottom wall 520 and extending upwardly from the bottom wall 520 and perpendicular to the bottom wall 520. The u-shaped frame member 120 defines an interior space 526 (shown in FIG. 8) between the bottom wall 520 and the first and second side walls 522, 524 that is sized and shaped to hold the battery cells 50-80 and the foam layers 90-106 therein. In an exemplary embodiment, the u-shaped frame member 120 is constructed of a metal such as aluminum, steel, or stainless steel for example. The u-shaped frame member 120 is thermally conductive and conducts heat energy from the battery cells 50-80 to the cooling plate 40 (shown in FIG. 1).

Figure 9:
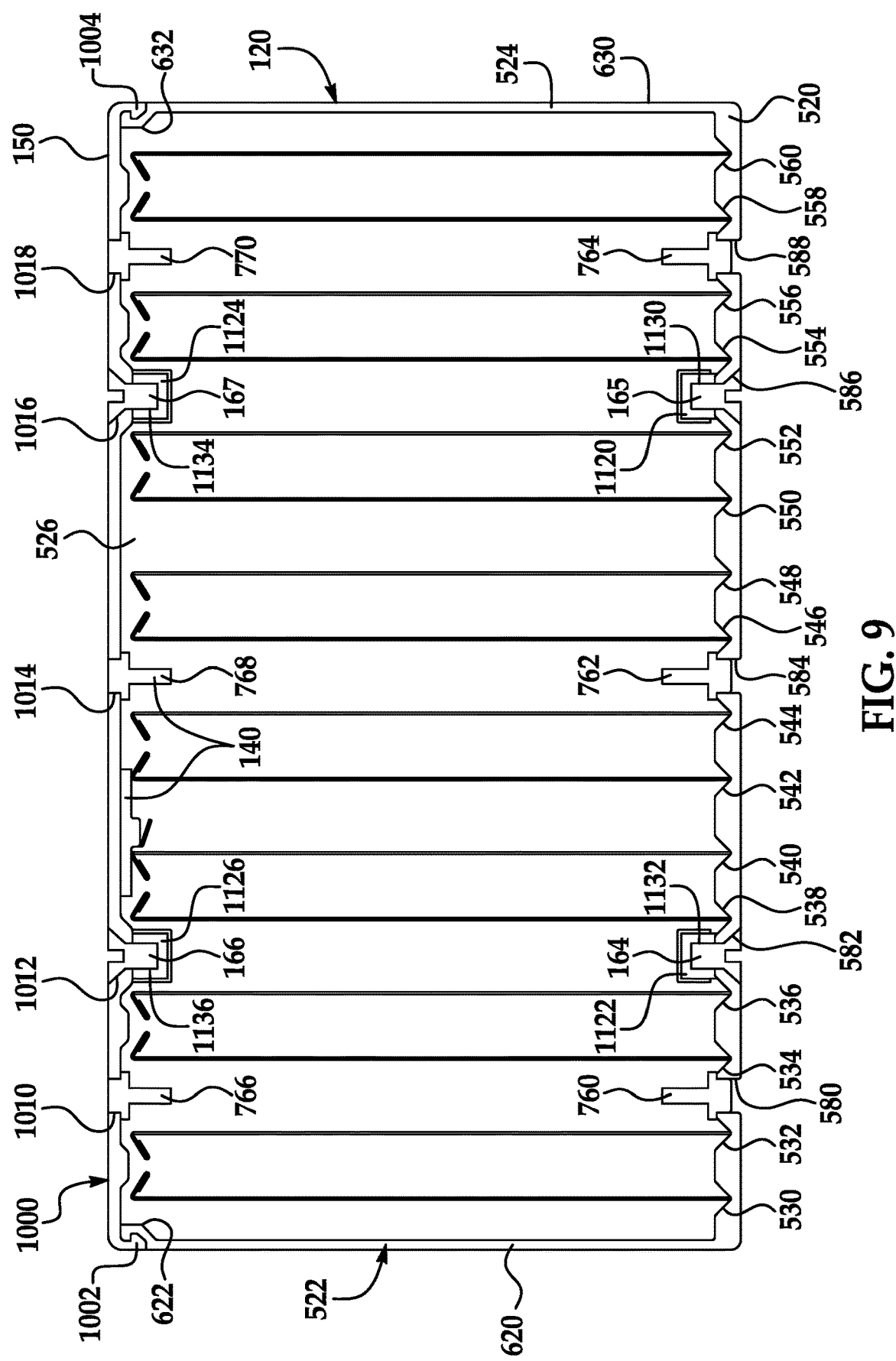
FIG. 9 is a cross-sectional view of the battery module of FIG. 1 taken along lines 9-9.
Figure 14:
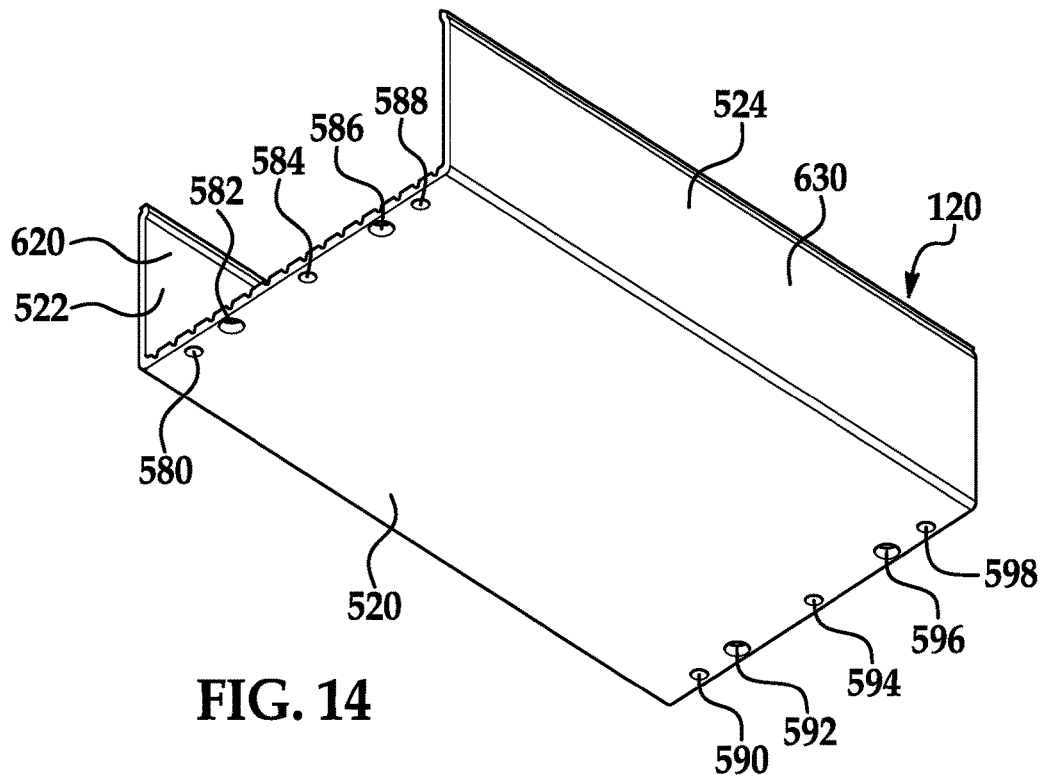
FIG. 14 is another schematic of the u-shaped frame member of FIG. 13.
Figure 15:
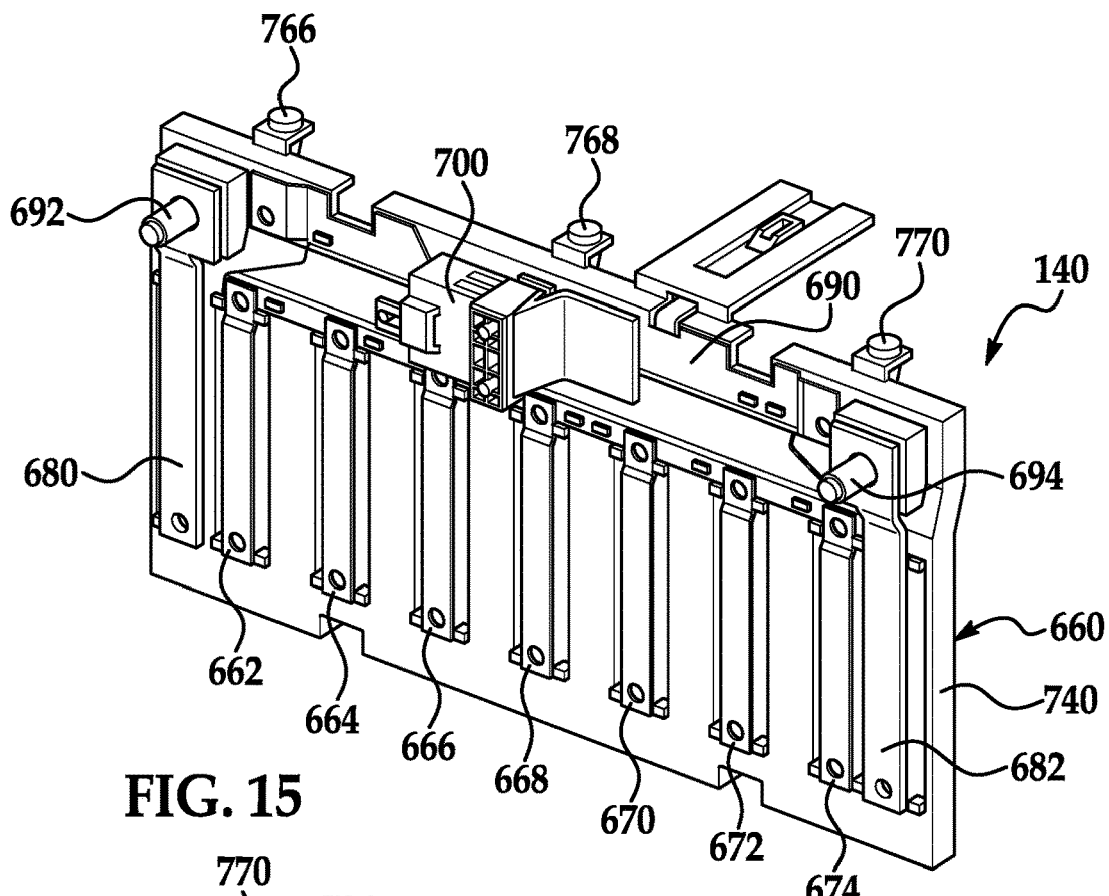
FIG. 15 is a schematic of a first interconnect assembly utilized in the battery module of FIG. 1.
Figure 16:
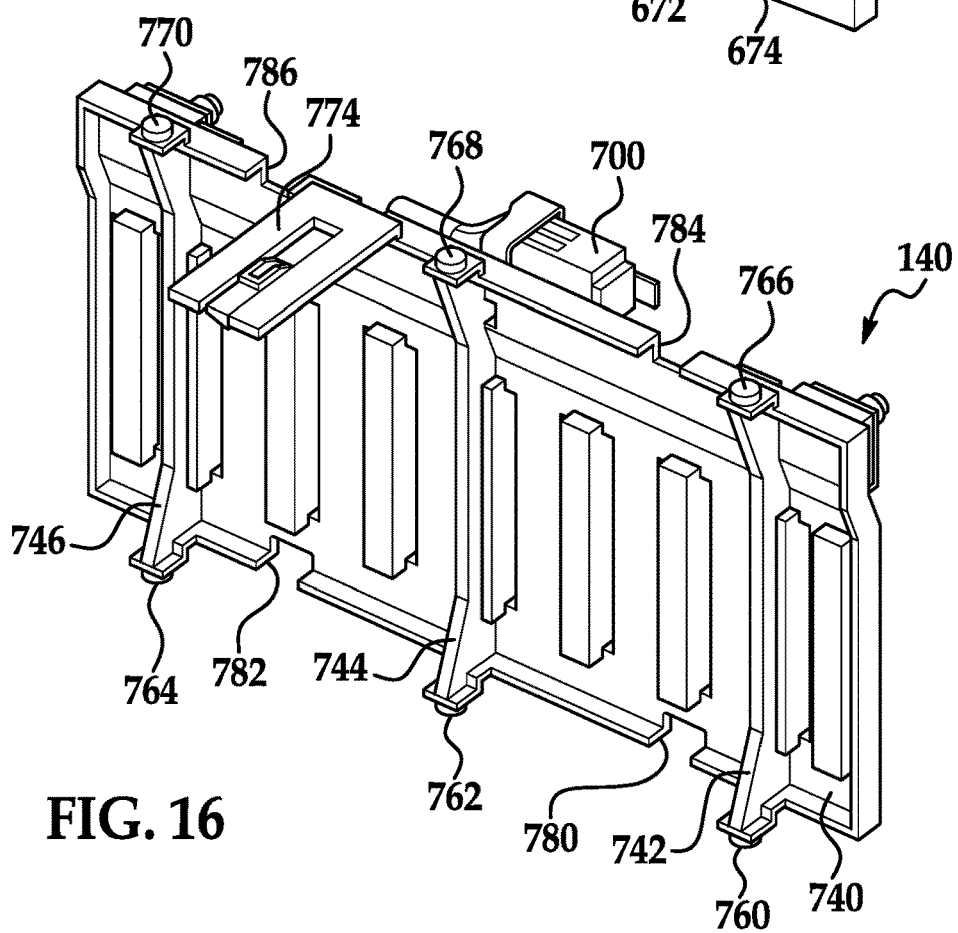
FIG. 16 is another schematic of the first interconnect assembly of FIG. 15.
Figure 17:
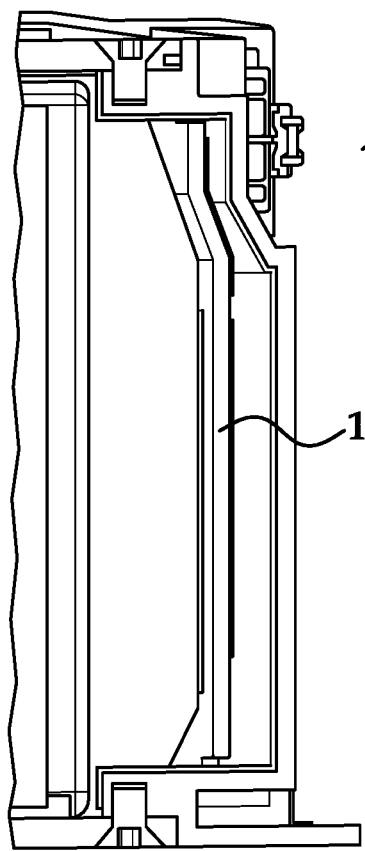
FIG. 17 is a cut-away view of a portion of the battery module of FIG. 1 illustrating the first interconnect assembly of FIG. 15.
Figure 18:
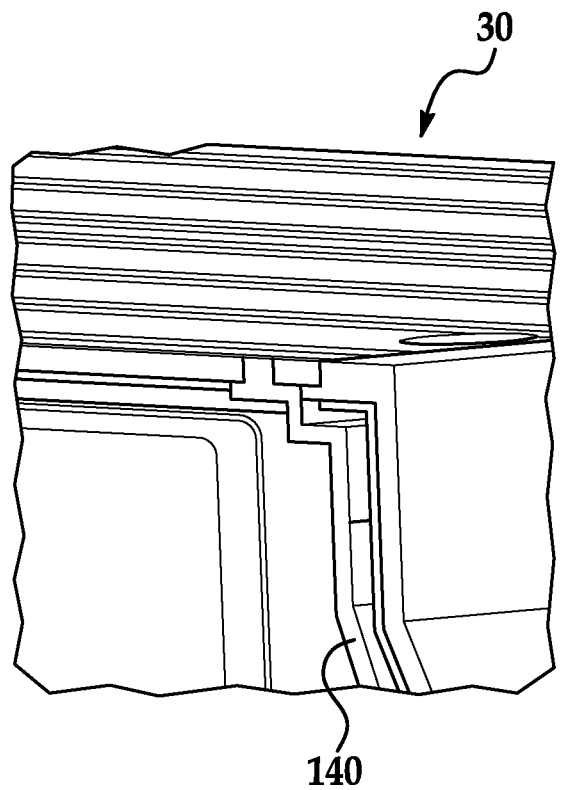
FIG. 18 is another cut-away view of a portion of the battery module of FIG. 1 illustrating a top portion of the first interconnect assembly of FIG. 15 coupled to a top cover plate.
Figure 19:
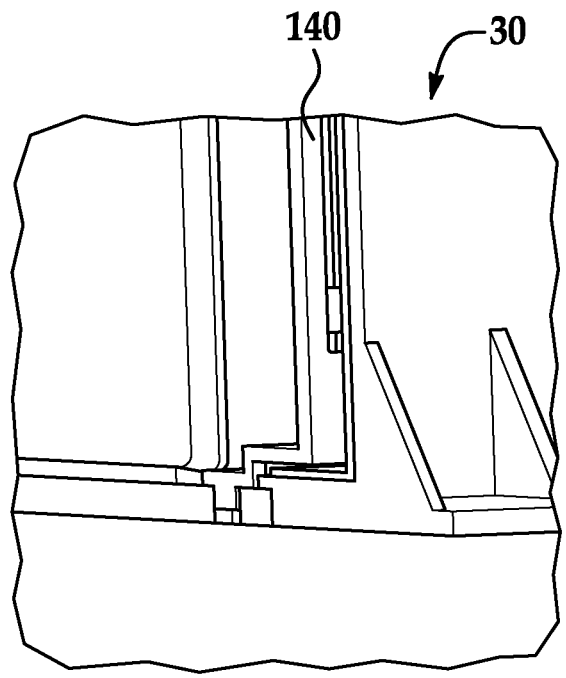
FIG. 19 is another cut-away view of a portion of the battery module of FIG. 1 illustrating a bottom portion of the first interconnect assembly of FIG. 15 coupled to a bottom wall of a u-shaped frame member.
Figure 20:
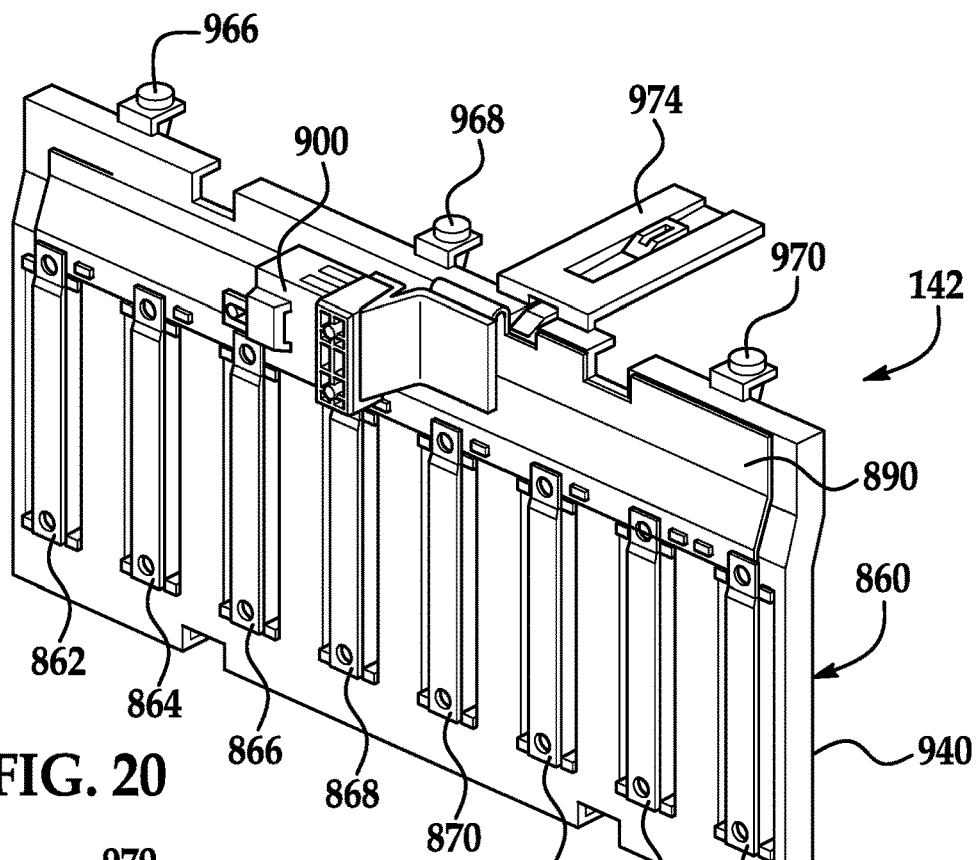
FIG. 20 is a schematic of a second interconnect assembly utilized in the battery module of FIG. 1.
Figure 21:
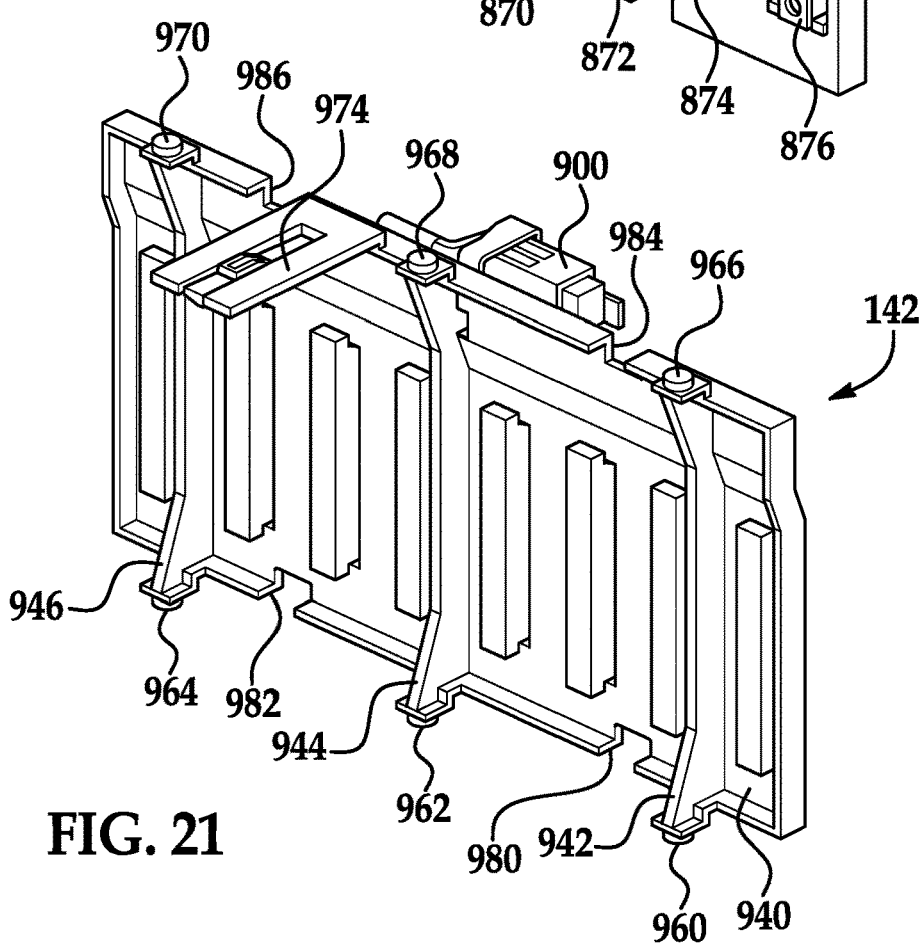
FIG. 21 is another schematic of the second interconnect assembly of FIG. 20.
Figure 22:
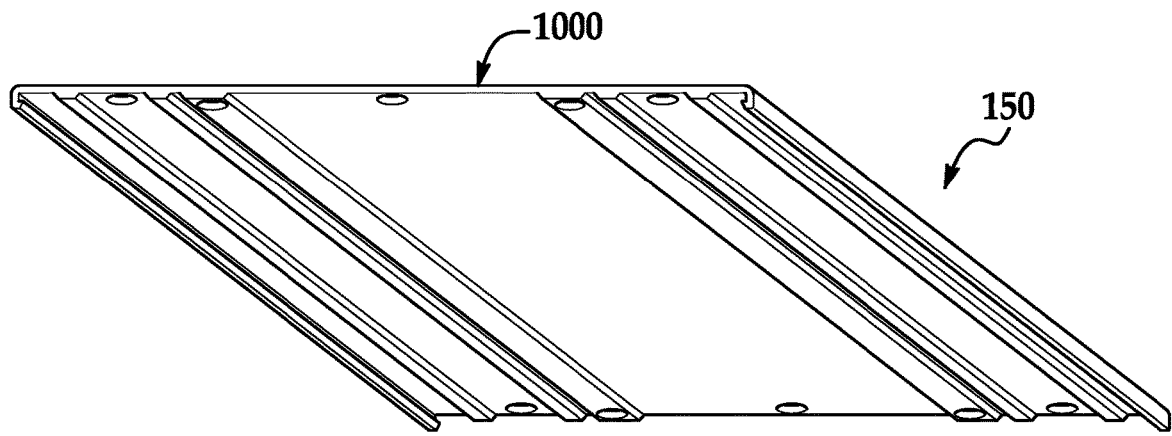
FIG. 22 is a schematic of a top cover plate utilized in the battery module of FIG. 1.
Figure 23:
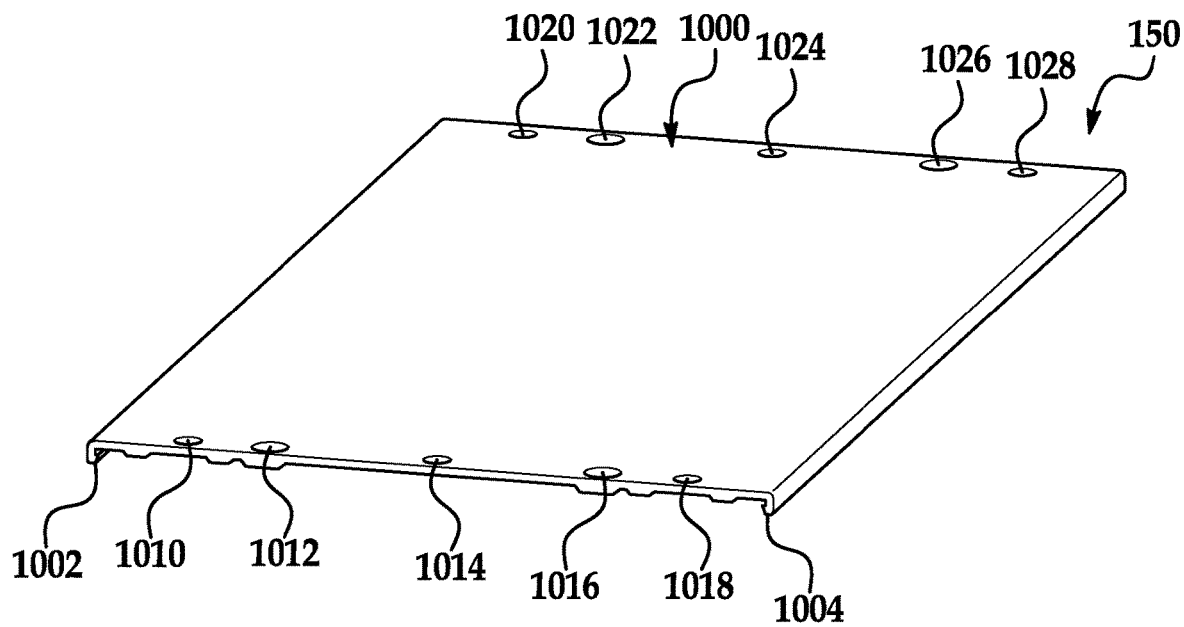
FIG. 23 is another schematic of the top cover plate of FIG. 22.

Referring to FIGS. 9 and 14, the bottom wall 520 is rectangular shaped and includes grooves 530, 532, 534, 536, 538, 540, 542, 544, 546, 548, 550, 552, 554, 556, 558, 560 that communicate with the interior space 526. The bottom wall 520 further includes apertures 580, 582, 584, 586, 588, 590, 592, 594, 596, 598 extending therethrough for receiving bolts therethrough.

The first side wall 522 includes a rectangular plate portion 620 and a coupling end portion 622. A first end of the rectangular plate portion 620 is coupled to the bottom wall 520. A second end of the rectangular plate portion 620 is coupled to the coupling end portion 622. The coupling end portion 622 is substantially c-shaped and is sized and shaped to be removably coupled to a coupling end portion 1002 (shown in FIG. 9) of the top cover plate 150.

The second side wall 524 includes a rectangular plate portion 630 and a coupling end portion 632. A first end of the rectangular plate portion 630 is coupled to the bottom wall 520. A second end of the rectangular plate portion 630 is coupled to the coupling end portion 632. The coupling end portion 632 is substantially c-shaped and is sized and shaped to be removably coupled to a coupling end portion 1004 (shown in FIG. 9) of the top cover plate 150.

Referring to FIGS. 4, 8, 9 and 15-19, the interconnect assembly 140 is disposed in the interior space 526 between the side cover plate 160 and a first end of the rectangular housings of the battery cells 50-80. The interconnect assembly 140 is coupled to the top cover plate 150 and the bottom wall 520 of the u-shaped frame member 120. The interconnect assembly 140 is further electrically coupled to electrical terminals on a first end of the battery cells 50-80.

The interconnect assembly 140 includes a faceplate 660, interconnect members 662, 664, 666, 668, 670, 672, 674, bus bars 680, 682, a flexible circuit board 690, electrical posts 692, 694, and an electrical connector 700.

The faceplate 660 includes a rectangular wall 740, rib portions 742, 744, 746, coupling tab members 760, 762, 764, 766, 768, 770, and an extension portion 774. In an exemplary embodiment, the faceplate 660 is constructed of plastic.

The rectangular wall 740 includes grooves 780, 782, 784, 786 extending therethrough.

The rib portions 742, 744, 746 are coupled to a first side of the rectangular wall 740 and extend vertically and substantially parallel to one another. Further, the rib portions 742, 744, 746 are spaced apart from one another.

The coupling tab member 760 is provided to couple the interconnect assembly 140 to the u-shaped frame member 120. The coupling tab member 760 is coupled to and extends downwardly from a bottom end of the rib portion 742. The coupling tab member 760 extends into an aperture 580 in the bottom wall 520 of the u-shaped frame member 120 to couple the interconnect assembly 140 to the bottom wall 520 of the u-shaped frame member 120.

The coupling tab member 762 is provided to couple the interconnect assembly 140 to the u-shaped frame member 120. The coupling tab member 762 is coupled to and extends downwardly from a bottom end of the rib portion 744. The coupling tab member 762 extends into an aperture 584 in the bottom wall 520 of the u-shaped frame member 120 to couple the interconnect assembly 140 to the bottom wall 520 of the u-shaped frame member 120.

The coupling tab member 764 is provided to couple the interconnect assembly 140 to the u-shaped frame member 120. The coupling tab member 764 is coupled to and extends downwardly from a bottom end of the rib portion 746. The coupling tab member 764 extends into an aperture 588 in the bottom wall 520 of the u-shaped frame member 120 to couple the interconnect assembly 140 to the bottom wall 520 of the u-shaped frame member 120.

The coupling tab member 766 is provided to couple the interconnect assembly 140 to the top cover plate 150. The coupling tab member 766 is coupled to and extends upwardly from a top end of the rib portion 742. The coupling tab member 766 extends into an aperture 1010 in the top cover plate 150 to couple the interconnect assembly 140 to the top cover plate 150.

The coupling tab member 768 is provided to couple the interconnect assembly 140 to the top cover plate 150. The coupling tab member 768 is coupled to and extends upwardly from a top end of the rib portion 744. The coupling tab member 768 extends into an aperture 1014 in the top cover plate 150 to couple the interconnect assembly 140 to the top cover plate 150.

The coupling tab member 770 is provided to couple the interconnect assembly 140 to the top cover plate 150. The coupling tab member 770 is coupled to and extends upwardly from a top end of the rib portion 746. The coupling tab member 770 extends into an aperture 1018 in the top cover plate 150 to couple the interconnect assembly 140 to the top cover plate 150.

The extension portion 774 is coupled to a top end of the rectangular wall 740 and extends substantially perpendicular to the rectangular wall 740. The extension portion 774 is adapted to hold a temperature sensor thereon.

The interconnect members 662, 664, 666, 668, 670, 672, 674 are coupled to the faceplate 660. The interconnect members 662-674 are each constructed of an electrically conductive metal. The interconnect members 662-674 are electrically coupled to electrical terminals on a first end of the battery cells 50-80 for electrically coupling the battery cells 50-80 in series with one another.

The bus bars 680, 682 are coupled to the faceplate 660, and are electrically coupled to the electrical posts 692, 694, respectively. The bus bars 680, 682 are further electrically coupled to opposite ends of the battery cells 50-80 such that an operational voltage produced by the battery cells 50-80 is applied between the posts 692, 694. The posts 692, 694 are constructed of steel and are coupled to the faceplate 660.

The flexible circuit board 690 (also known as a flexible printed circuit) is coupled to the faceplate 660, and is provided to route voltages from the battery cells 50-80 to the electrical connector 700 for diagnostic purposes. The flexible circuit board 690 includes sensors for battery cell voltage sensing and battery cell temperature sensing. The electrical connector 700 is coupled to the faceplate 660.

The electrical connector 700 is provided to route battery cell voltages of the battery cells 50-80, and voltages indicating battery cell temperatures of the battery cells 50-80 to a microcontroller (not shown). The electrical connector 700 is coupled to the faceplate 660.

Referring to FIGS. 4, 8, 10, 20 and 21, the interconnect assembly 142 is disposed in the interior space 526 between the side cover plate 162 and a second end of the rectangular housings of the battery cells 50-80. The interconnect assembly 142 is coupled to the top cover plate 150 and the bottom wall 520 of the u-shaped frame member 120. The interconnect assembly 142 is further electrically coupled to electrical terminals on a second end of the battery cells 50-80.

The interconnect assembly 142 includes a faceplate 860, interconnect members 862, 864, 866, 868, 870, 872, 874, 876, a flexible circuit board 890, and an electrical connector 900.

The faceplate 860 includes a rectangular wall 940, rib portions 942, 944, 946, coupling tab members 960, 962, 964, 966, 968, 970, and an extension portion 974. In an exemplary embodiment, the faceplate 860 is constructed of plastic.

The rectangular wall 940 includes grooves 980, 982, 984, 986 extending therethrough.

The rib portions 942, 944, 946 are coupled to a first side of the rectangular wall 940 and extend vertically and substantially parallel to one another. Further, the rib portions 942, 944, 946 are spaced apart from one another.

The coupling tab member 960 is provided to couple the interconnect assembly 142 to the u-shaped frame member 120. The coupling tab member 960 is coupled to and extends downwardly from a bottom end of the rib portion 942. The coupling tab member 960 extends into an aperture 598 in the bottom wall 520 of the u-shaped frame member 120 to couple the interconnect assembly 142 to the bottom wall 520 of the u-shaped frame member 120.

The coupling tab member 962 is provided to couple the interconnect assembly 142 to the u-shaped frame member 120. The coupling tab member 962 is coupled to and extends downwardly from a bottom end of the rib portion 944. The coupling tab member 962 extends into an aperture 594 in the bottom wall 520 of the u-shaped frame member 120 to couple the interconnect assembly 142 to the bottom wall 520 of the u-shaped frame member 120.

The coupling tab member 964 is provided to couple the interconnect assembly 142 to the u-shaped frame member 120. The coupling tab member 964 is coupled to and extends downwardly from a bottom end of the rib portion 946. The coupling tab member 964 extends into an aperture 590 in the bottom wall 520 of the u-shaped frame member 120 to couple the interconnect assembly 142 to the bottom wall 520 of the u-shaped frame member 120.

The coupling tab member 966 is provided to couple the interconnect assembly 142 to the top cover plate 150. The coupling tab member 966 is coupled to and extends upwardly from a top end of the rib portion 942. The coupling tab member 966 extends into an aperture 1028 in the top cover plate 150 to couple the interconnect assembly 142 to the top cover plate 150.

The coupling tab member 968 is provided to couple the interconnect assembly 142 to the top cover plate 150. The coupling tab member 968 is coupled to and extends upwardly from a top end of the rib portion 944. The coupling tab member 968 extends into an aperture 1024 in the top cover plate 150 to couple the interconnect assembly 142 to the top cover plate 150.

The coupling tab member 970 is provided to couple the interconnect assembly 142 to the top cover plate 150. The coupling tab member 970 is coupled to and extends upwardly from a top end of the rib portion 946. The coupling tab member 970 extends into an aperture 1020 in the top cover plate 150 to couple the interconnect assembly 140 to the top cover plate 150.

The extension portion 974 is coupled to a top end of the rectangular wall 940 and extends substantially perpendicular to the rectangular wall 940. The extension portion 974 is adapted to hold a temperature sensor thereon.

The interconnect members 862, 864, 866, 868, 870, 872, 874, 876 are coupled to the faceplate 860. The interconnect members 862-876 are each constructed of an electrically conductive metal. The interconnect members 862-876 are electrically coupled to electrical terminals on a second end of the battery cells 50-80 for electrically coupling the battery cells 50-80 in series with one another.

The flexible circuit board 890 (also known as a flexible printed circuit) is coupled to the faceplate 860, and is provided to route voltages from the battery cells 50-80 to the electrical connector 900 for diagnostic purposes. The flexible circuit board 890 includes sensors for battery cell voltage sensing and battery cell temperature sensing. The electrical connector 900 is coupled to the faceplate 860.

The electrical connector 900 is provided to route battery cell voltages of the battery cells 50-80, and voltages indicating battery cell temperatures of the battery cells 50-80 to a microcontroller (not shown). The electrical connector 900 is coupled to the faceplate 860.

Referring to FIGS. 4, 9, 22 and 23, the top cover plate 150 is provided to enclose a top open region of the u-shaped frame member 120. The top cover plate 150 includes a rectangular wall 1000 and coupling end portions 1002, 1004. The rectangular wall 1000 includes apertures 1010, 1012, 1014, 1016, 1018, 1020, 1022, 1024, 1026, 1028. A first end of the rectangular wall 1000 is coupled to the coupling end portion 1002. A second end of the rectangular wall 1000 is coupled to the coupling end portion 1004. The coupling end portion 1002 is substantially c-shaped and is sized and shaped to be removably coupled to a coupling end portion 622 (shown in FIG. 9) of the first side wall 522 of the u-shaped frame member 120. Further, the coupling end portion 1004 is substantially c-shaped and is sized and shaped to be removably coupled to a coupling end portion 632 (shown in FIG. 9) of the second side wall 524 of the u-shaped frame member 120. In an exemplary embodiment, the top cover plate 150 is constructed of plastic.

Figure 4:
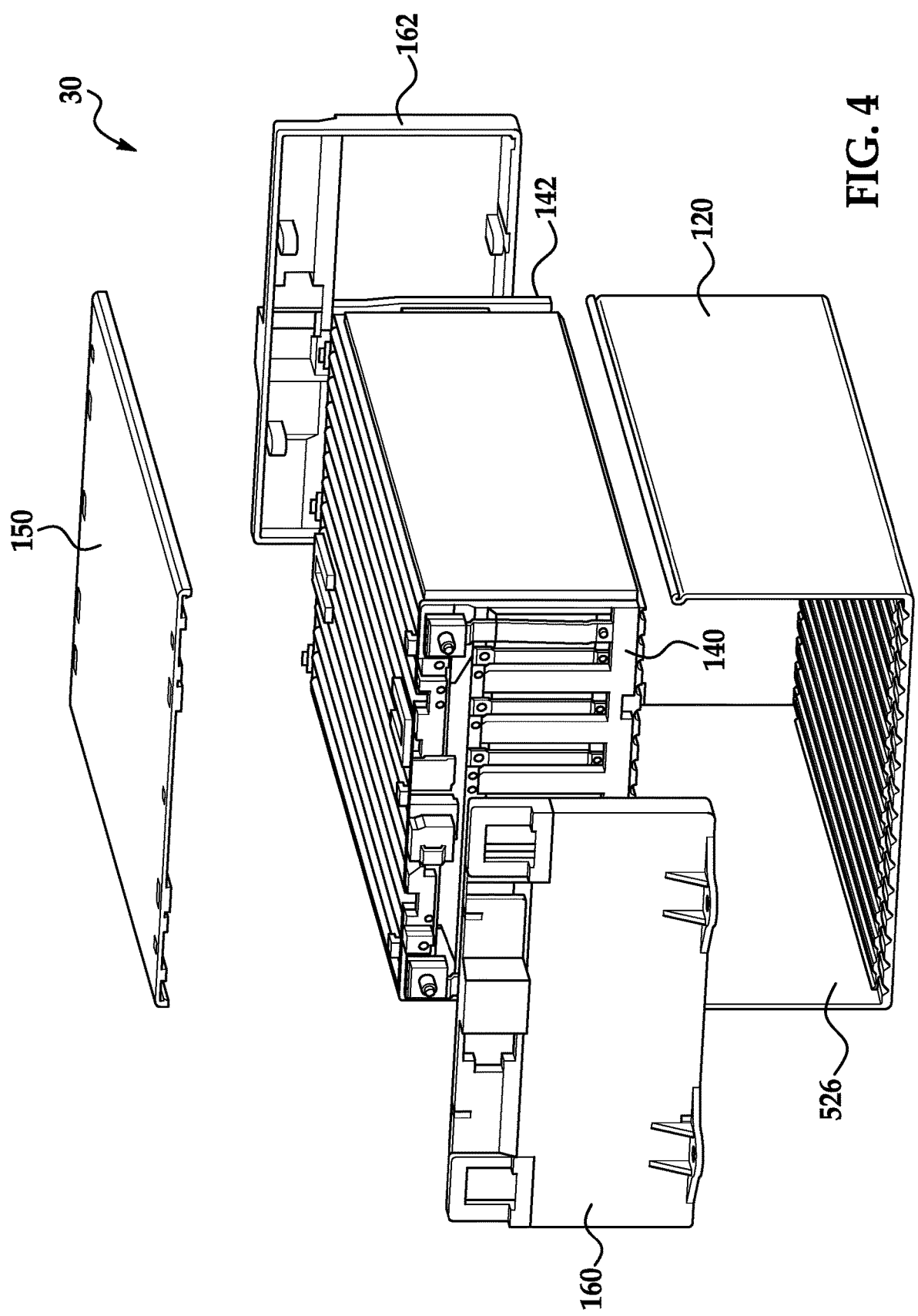
FIG. 4 is an exploded view of the battery module of FIG. 1.
Figure 5:
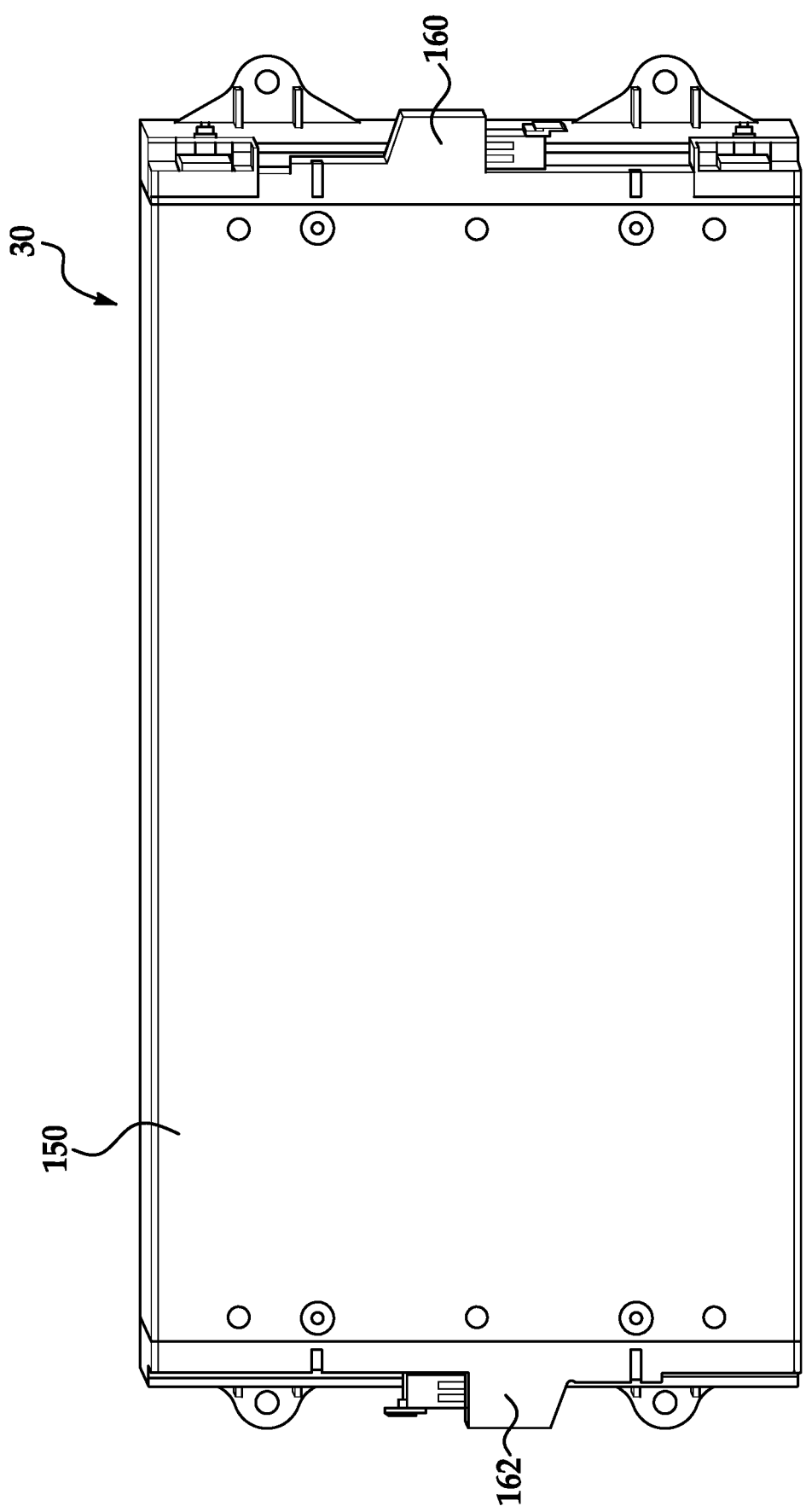
FIG. 5 is a top view of the battery module of FIG. 1.
Figure 6:
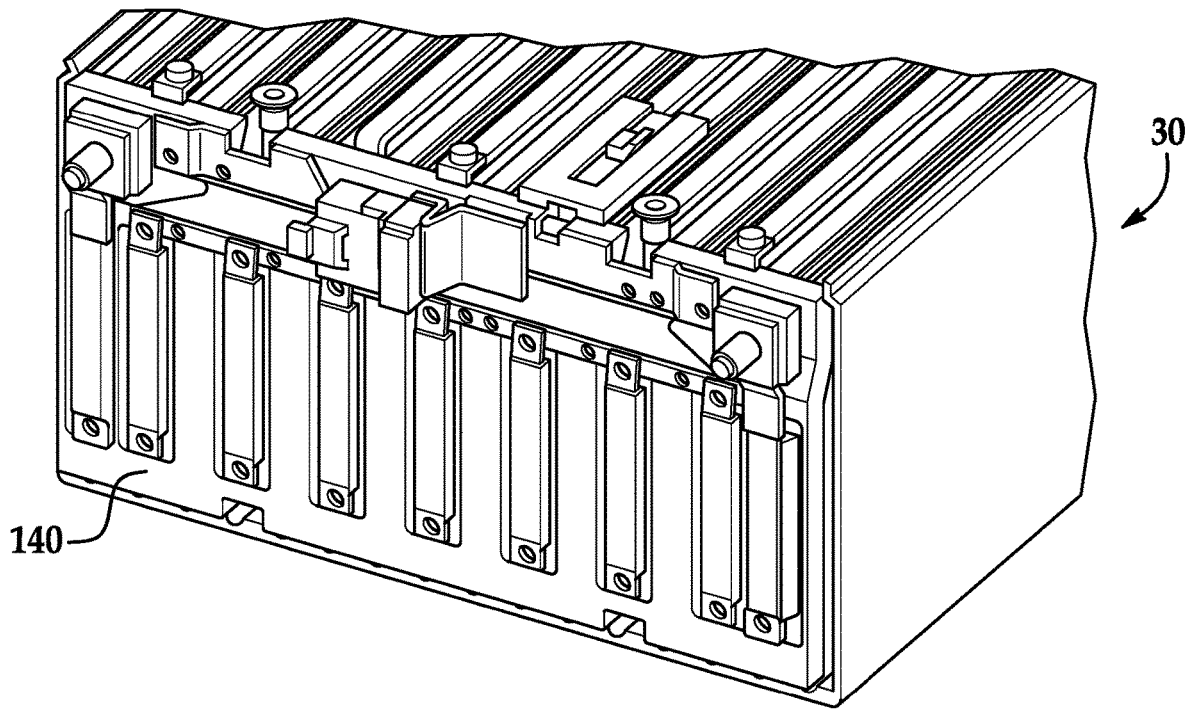
FIG. 6 is a side view of a portion of the battery module of FIG. 1 illustrating a first interconnect assembly therein.
Figure 7:
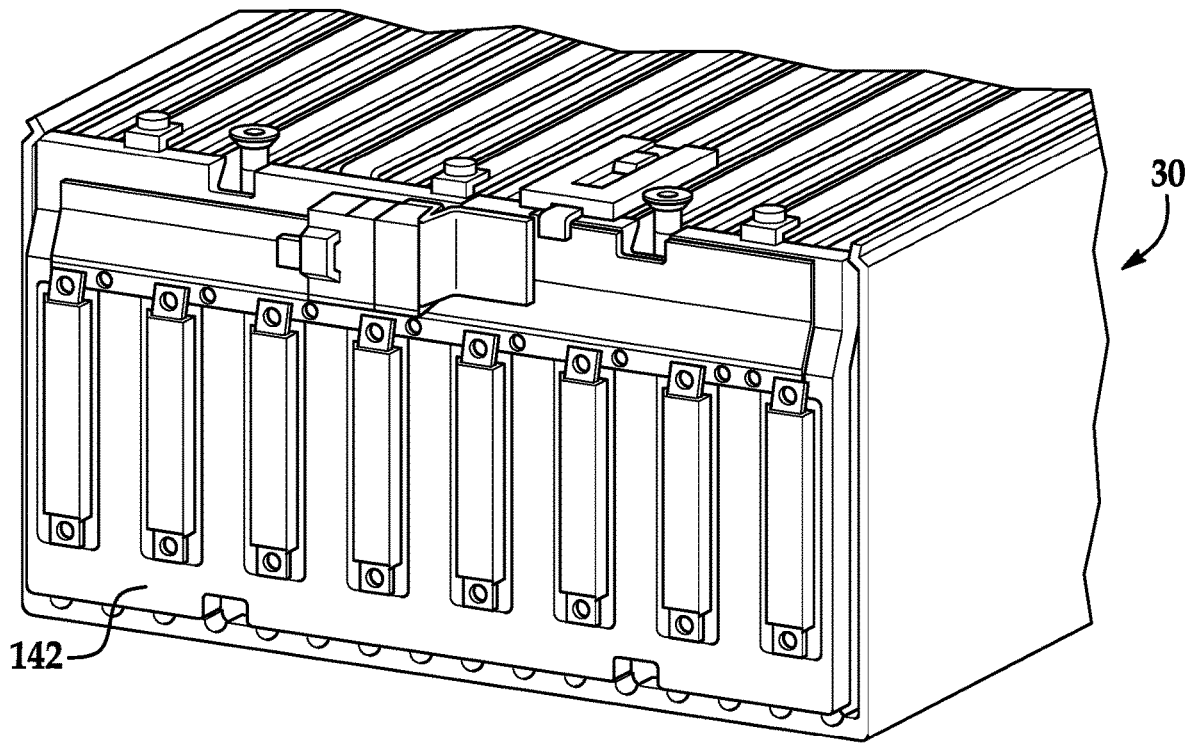
FIG. 7 is a side view of another portion of the battery module of FIG. 1 illustrating a second interconnect assembly therein.
Figure 24:
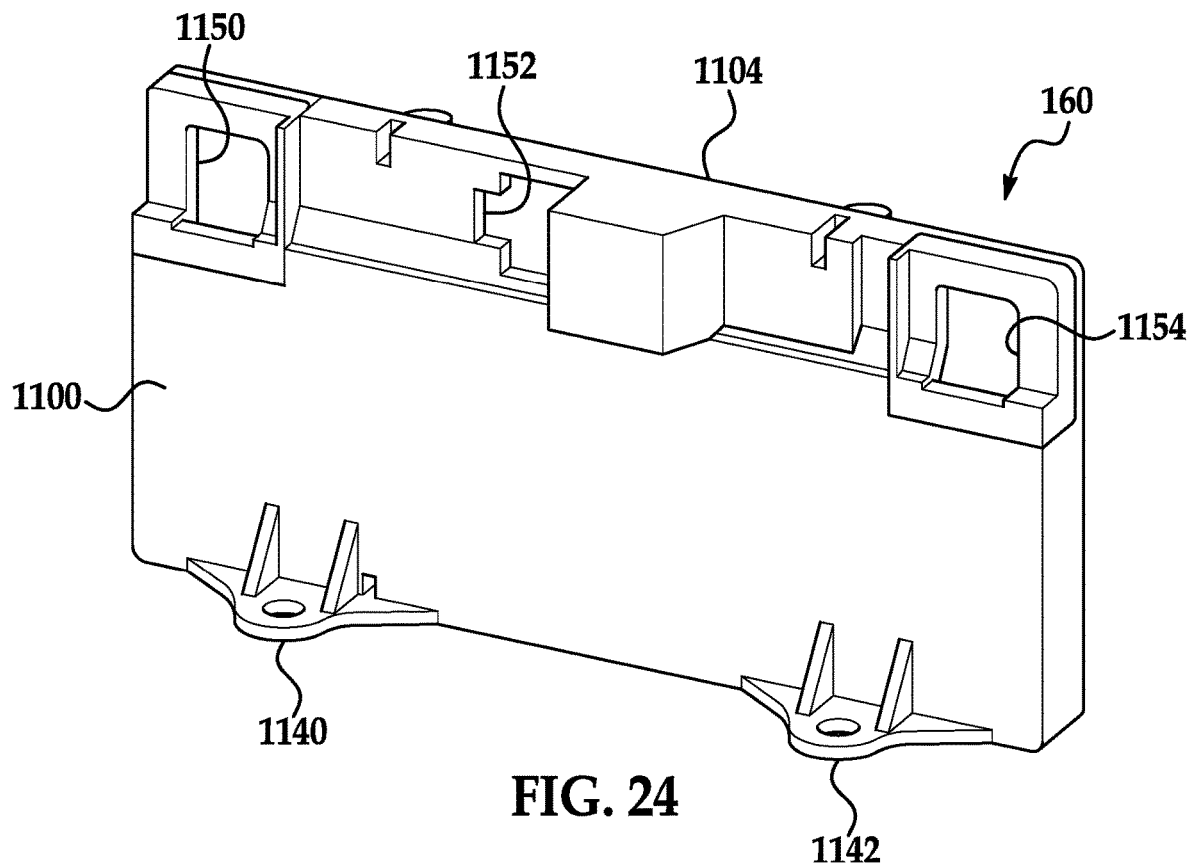
FIG. 24 is a schematic of a first side cover plate utilized in the battery module of FIG. 1.
Figure 25:
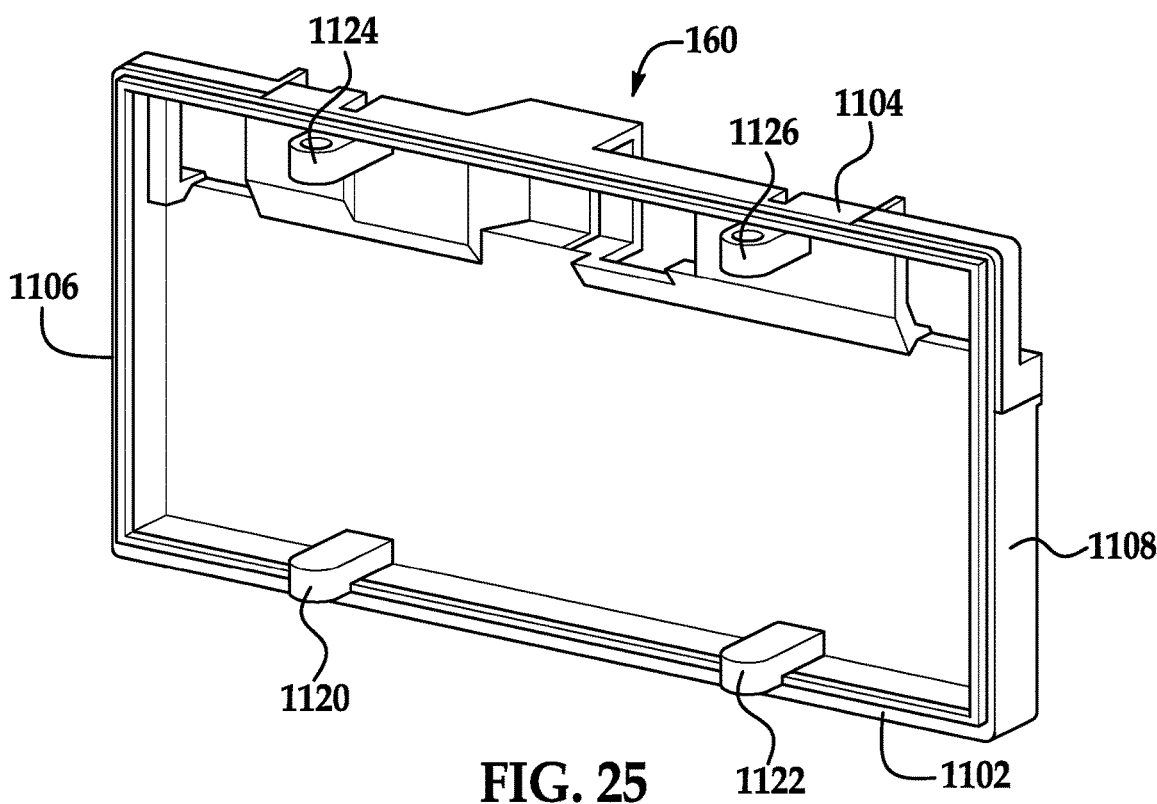
FIG. 25 is another schematic of the first side cover plate of FIG. 24.

Referring to FIGS. 4, 24 and 25, the side cover plate 160 is provided to enclose the interconnect assembly 140 between the side cover plate 160 and the battery cells 50-80. The side cover plate 160 is attached to the u-shaped frame member 120 and the top plate 150. The side cover plate 160 includes a rectangular wall 1100, a bottom side cover plate wall 1102, a top cover plate wall 1104, side walls 1106, 1108, bolt receiving members 1120, 1122, 1124, 1126, and mounting pads 1140, 1142. In an exemplary embodiment, the side cover plate 160 is constructed of plastic.

Referring to FIGS. 1, 24 and 25, the rectangular wall 1100 includes apertures 1150, 1152 and 1154 extending therethrough. The aperture 1150 is sized and shaped to receive the electrical post 692 therethrough. The aperture 1152 is sized and shaped to receive the electrical connector 700 therethrough. The aperture 1154 is sized and shaped to receive the electrical post 694 therethrough.

The bottom side cover plate wall 1102 is coupled to a bottom end of the rectangular wall 1100 and extends in a first direction perpendicular to the wall 1100.

The top cover plate wall 1104 is coupled to a top end of the rectangular wall 1100 and extends in the first direction perpendicular to the wall 1100. Further, the top cover plate wall 1104 extends substantially parallel to the bottom side cover plate wall 1102.

The side wall 1106 is coupled to a first side end of the rectangular wall 1100 and extends in the first direction perpendicular to the wall 1100. Further, the side wall 1106 is coupled to and extends between the bottom side cover plate wall 1102 and the top cover plate wall 1104.

The side wall 1108 is coupled to a second side end of the rectangular wall 1100 and extends in the first direction perpendicular to the wall 1100. Further, the side wall 1108 is coupled to and extends between the bottom side cover plate wall 1102 and the top cover plate wall 1104. Further, the side wall 1108 extends substantially parallel to the side wall 1106.

Referring to FIGS. 9, 24 and 25, the bolt receiving member 1120 is coupled to and extends outwardly from the bottom side cover plate wall 1102 in the first direction. The bolt receiving member 1120 includes an aperture 1130 extending therein. The bolt 165 extends through the aperture 586 in the bottom wall 520 of the u-shaped frame member 120 and into an aperture 1130 of the bolt receiving member 1120 to couple the side cover plate 160 to the u-shaped frame member 120.

The bolt receiving member 1122 is coupled to and extends outwardly from the bottom side cover plate wall 1102 in the first direction. The bolt receiving member 1122 includes an aperture 1132 extending therein. The bolt 164 extends through the aperture 582 in the bottom wall 520 of the u-shaped frame member 120 and into an aperture 1132 of the bolt receiving member 1122 to couple the side cover plate 160 to the u-shaped frame member.

The bolt receiving member 1124 is coupled to and extends outwardly from the top cover plate wall 1104 in the first direction. The bolt receiving member 1124 includes an aperture 1134 extending therein. The bolt 167 extends through the aperture 1016 in the top cover plate 150 and into an aperture 1134 of the bolt receiving member 1124 to couple the side cover plate 160 to the top cover plate 150.

The bolt receiving member 1126 is coupled to and extends outwardly from the top cover plate wall 1104 in the first direction. The bolt receiving member 1126 includes an aperture 1136 extending therein. The bolt 166 extends through the aperture 1012 in the top cover plate 150 and into an aperture 1136 of the bolt receiving member 1126 to couple the side cover plate 160 to the top cover plate 150.

The mounting pads 1140, 1142 are coupled to and extend outwardly from the rectangular wall 1100 in a second direction. The mounting pads 1140, 1142 are utilized to couple the battery module 30 to the cooling plate 40 utilizing first and second bolts respectively.

Referring to FIGS. 4, 10, 26 and 27, the side cover plate 162 is provided to enclose the interconnect assembly 142 between the side cover plate 162 and the battery cells 50-80. The side cover plate 162 is attached to the u-shaped frame member 120 and the top plate 150. The side cover plate 162 includes a rectangular wall 1200, a bottom wall 1202, a top wall 1204, side walls 1206, 1208, bolt receiving members 1220, 1222, 1224, 1226, and mounting pads 1240, 1242. In an exemplary embodiment, the side cover plate 162 is constructed of plastic.

Figure 2:
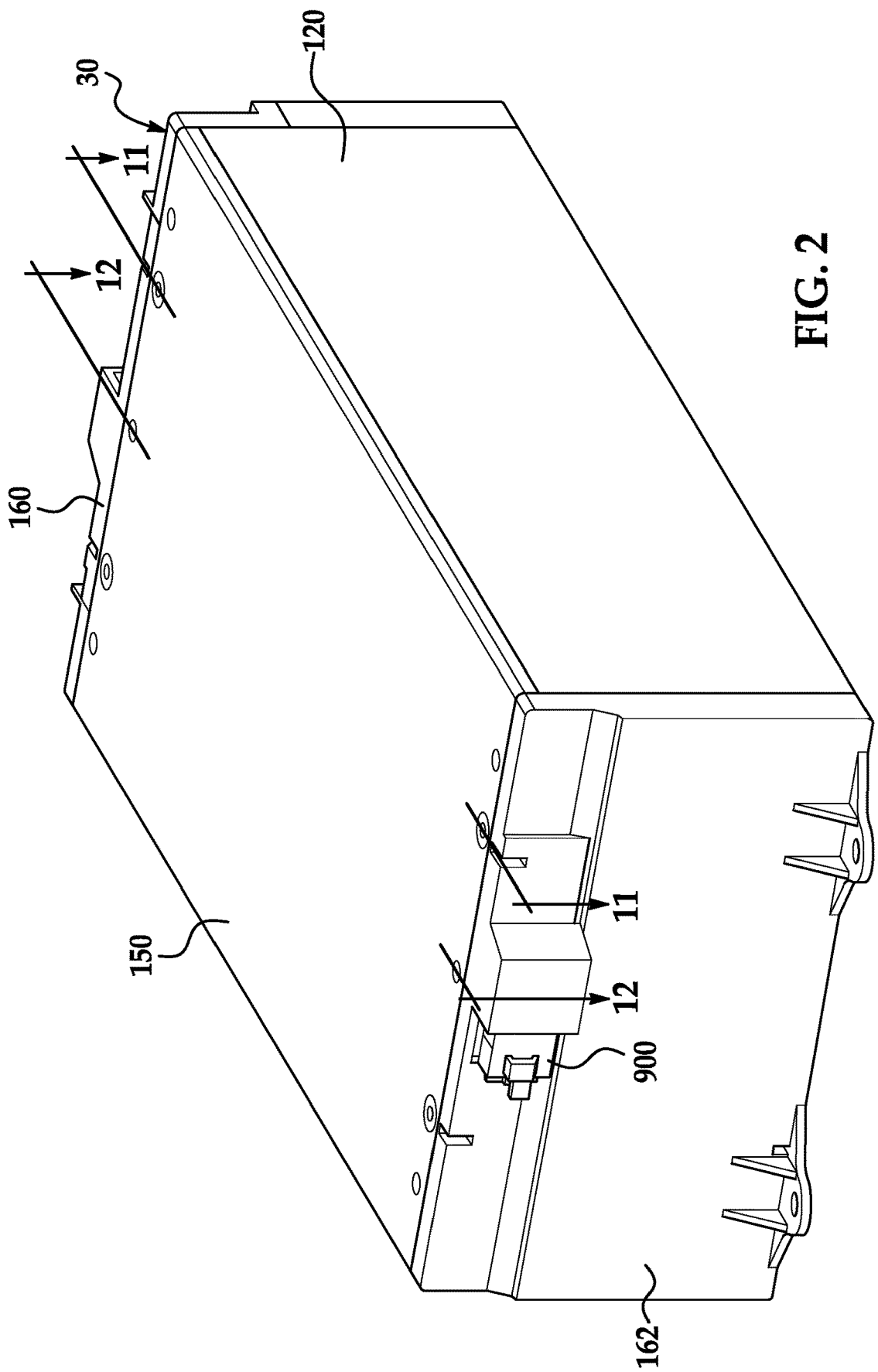
FIG. 2 is another schematic of the battery module of FIG. 1.
Figure 3:
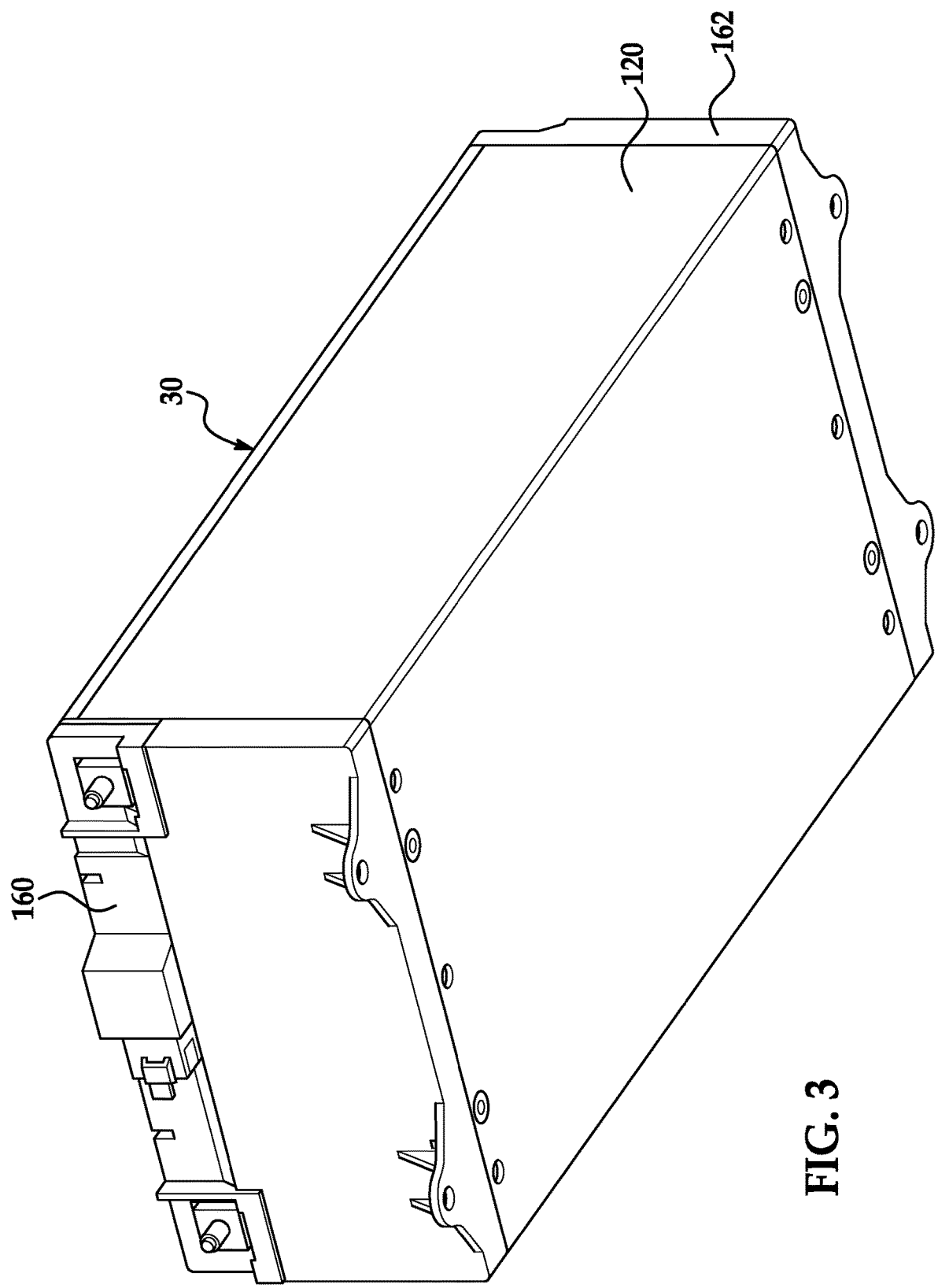
FIG. 3 is another schematic of the battery module of FIG. 1.
Figure 26:
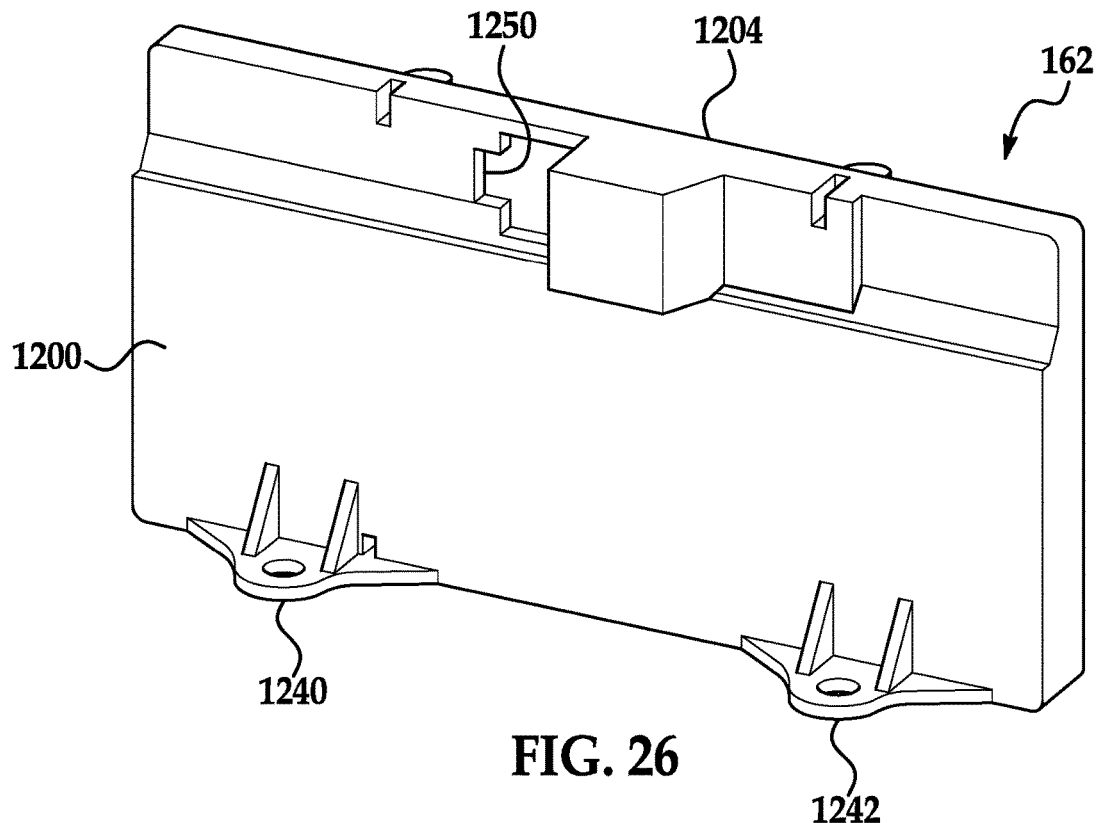
FIG. 26 is a schematic of a second side cover plate utilized in the battery module of FIG. 1.
Figure 27:
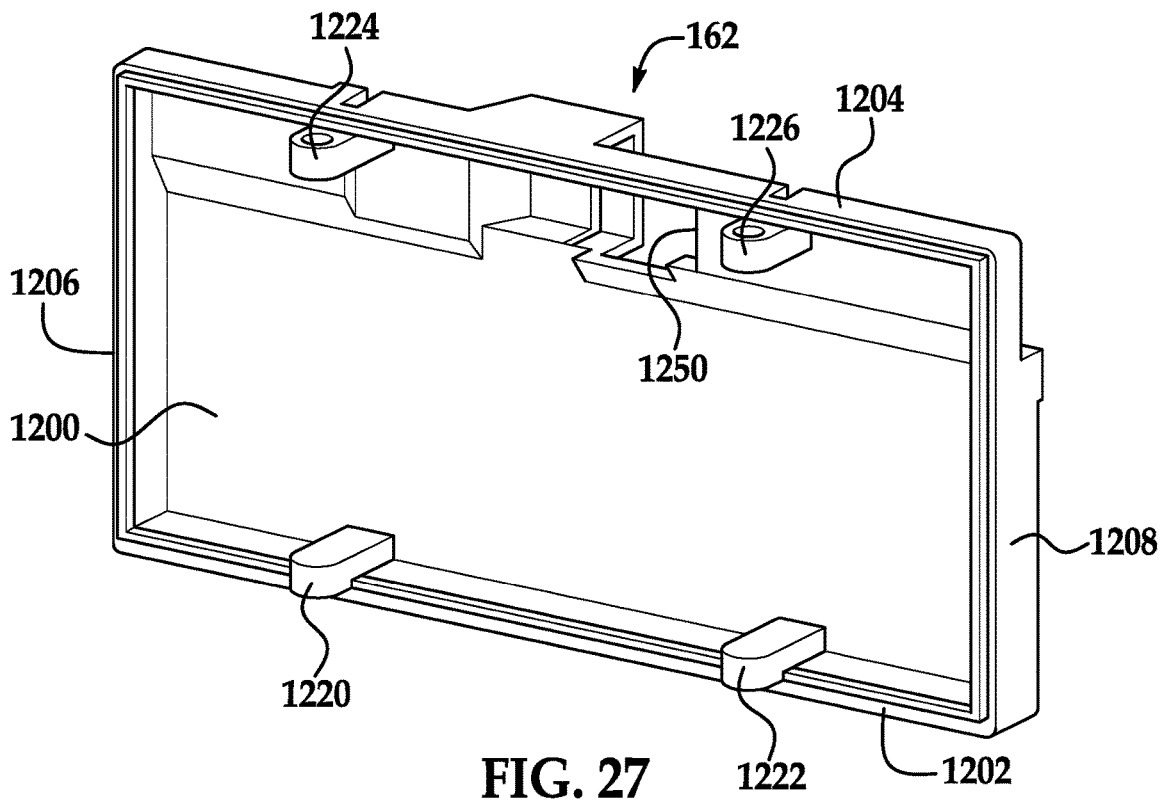
FIG. 27 is another schematic of the second side cover plate of FIG. 26.
Figure 28:
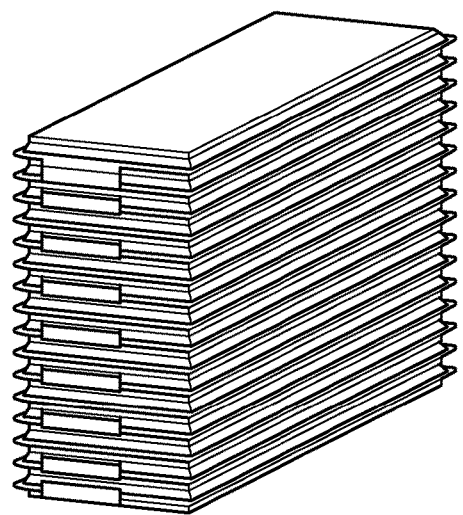
FIG. 28 is a schematic of a plurality of battery cells utilized in the battery module of FIG. 1.
Figure 29:
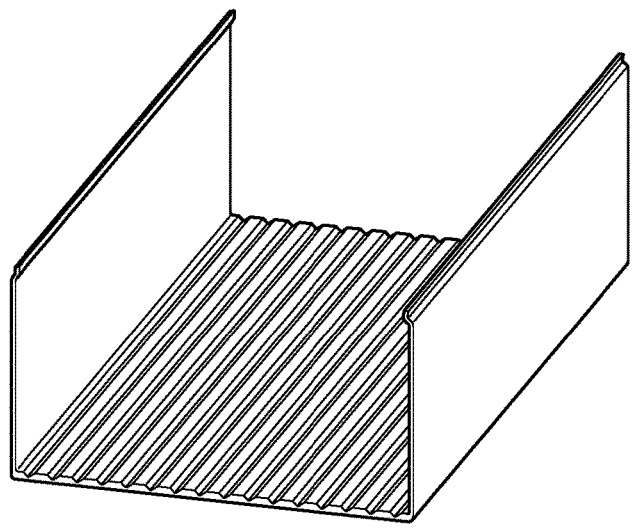
FIG. 29 is another schematic of the u-shaped frame member of FIG. 13.
Figure 30:
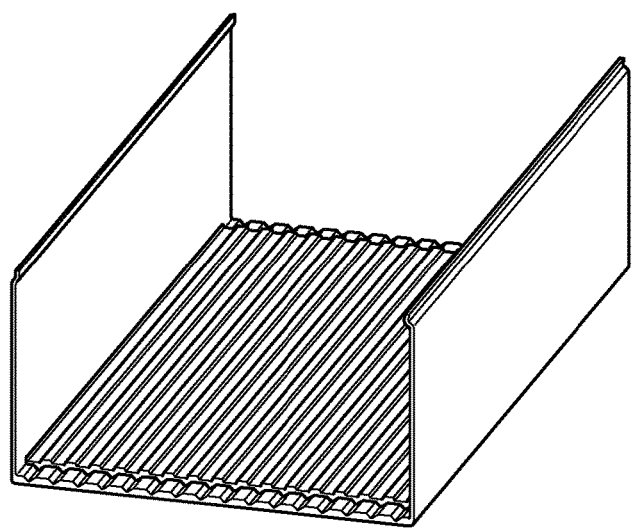
FIG. 30 is another schematic of the u-shaped frame member of FIG. 13 having the thermally conductive layer disposed on the u-shaped frame member.
Figure 31:
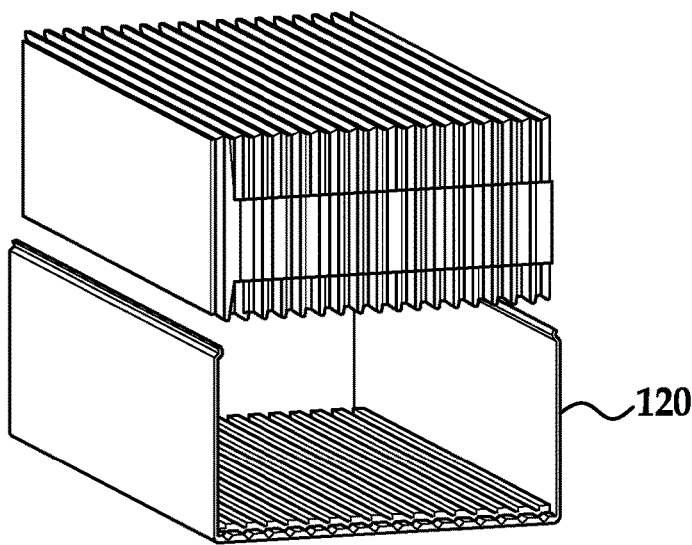
FIG. 31 is a schematic of the plurality of battery cells of FIG. 28 being disposed in the u-shaped frame member of FIG. 30 by placing the stack of battery cells in the interior space of the u-shaped frame member.
Figure 32:
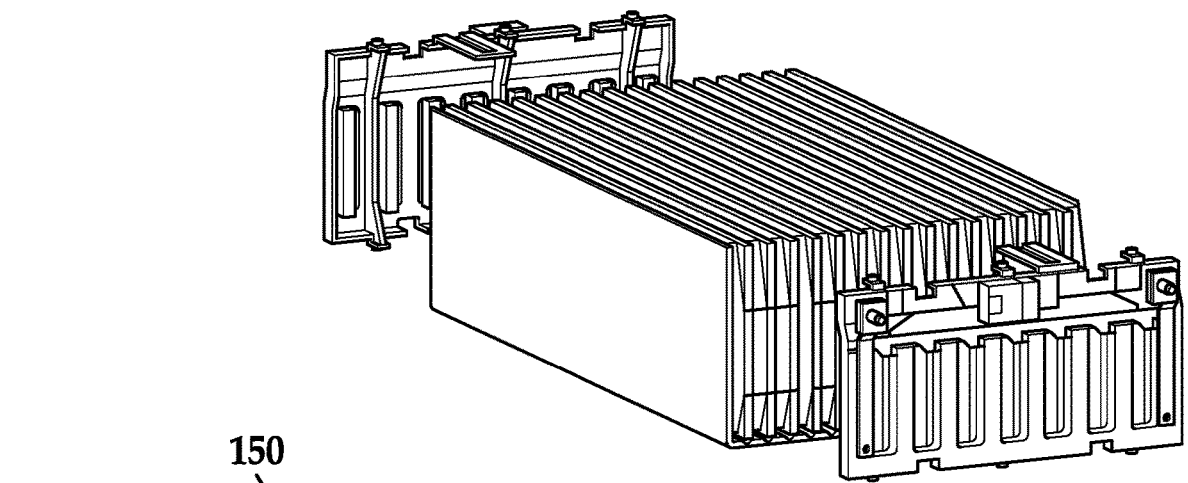
FIG. 32 is a schematic of the first interconnect assembly of FIG. 15 and the second interconnect assembly of FIG. 20 being coupled to the u-shaped frame member of FIG. 31.
Figure 33:
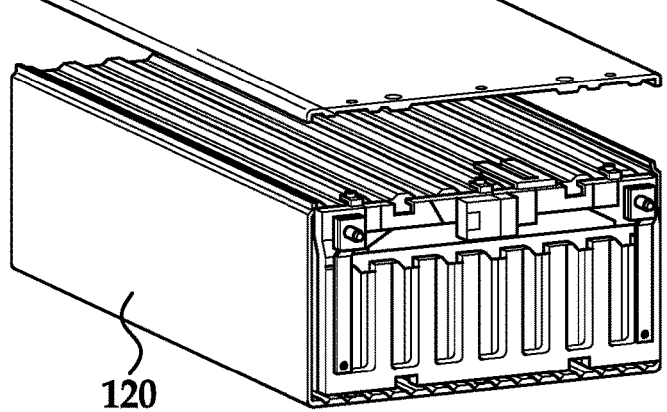
FIG. 33 is a schematic of the top cover plate of FIG. 23 being coupled to the u-shaped frame member and the first and second interconnect assemblies of FIG. 32.
Figure 34:
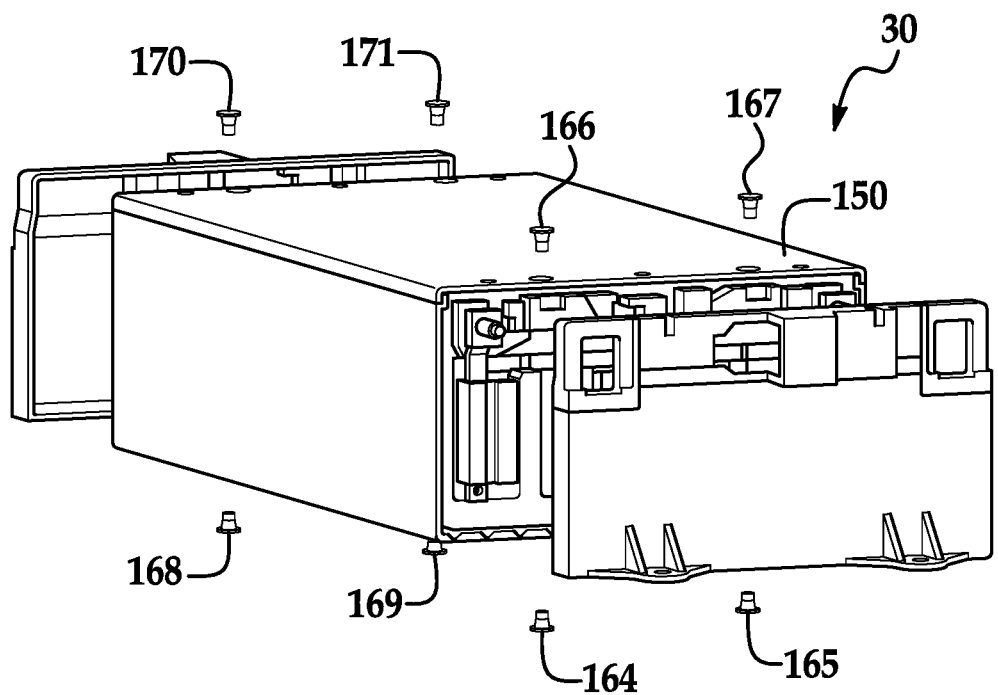
FIG. 34 is a schematic of first and second side cover plates of being coupled to the top cover plate, the u-shaped frame member and the first and second interconnect assemblies of FIG. 33.
Figure 35:
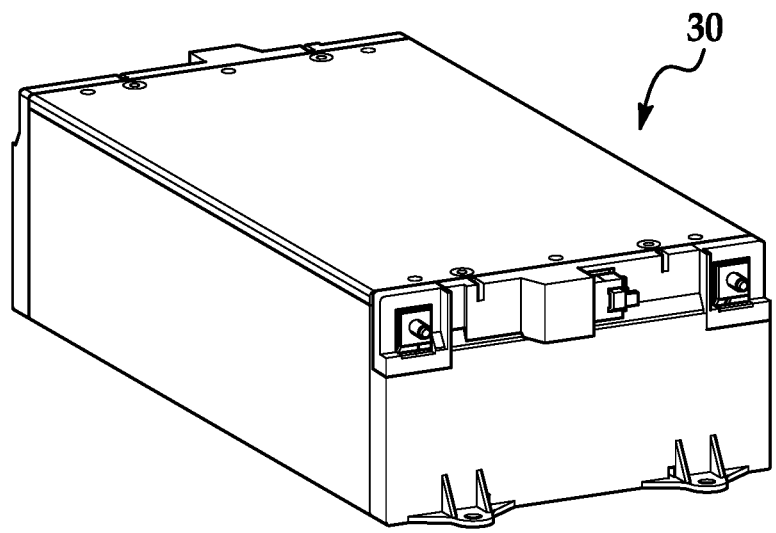
FIG. 35 is a schematic of a completely assembled battery module.
Figure 36:
FIG. 36 is a block diagram of a manufacturing system.
Figure 37:
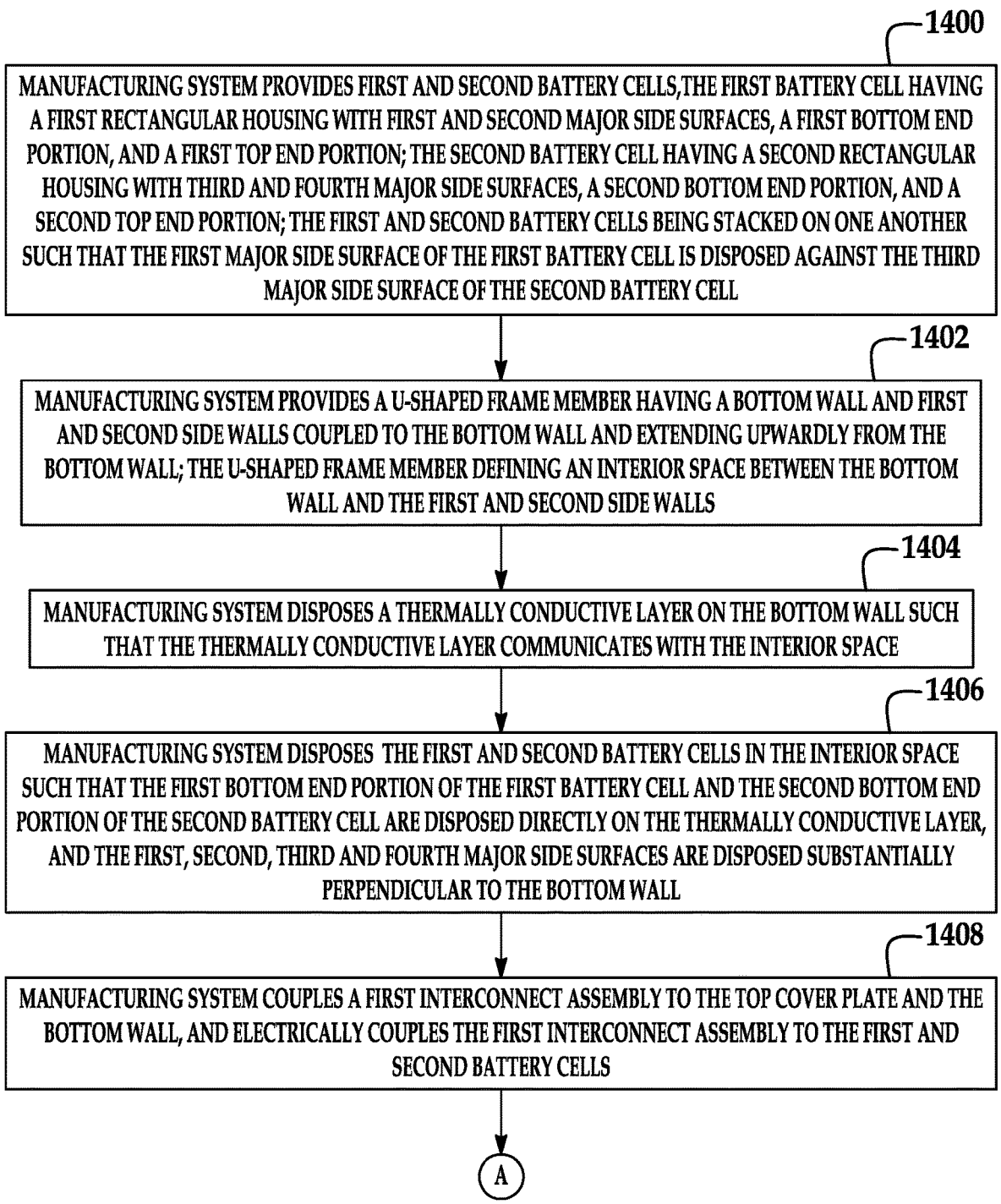
FIGS. 37 and 38 are flowcharts of a method of assembling a battery module in accordance with another exemplary embodiment.
Figure 38:
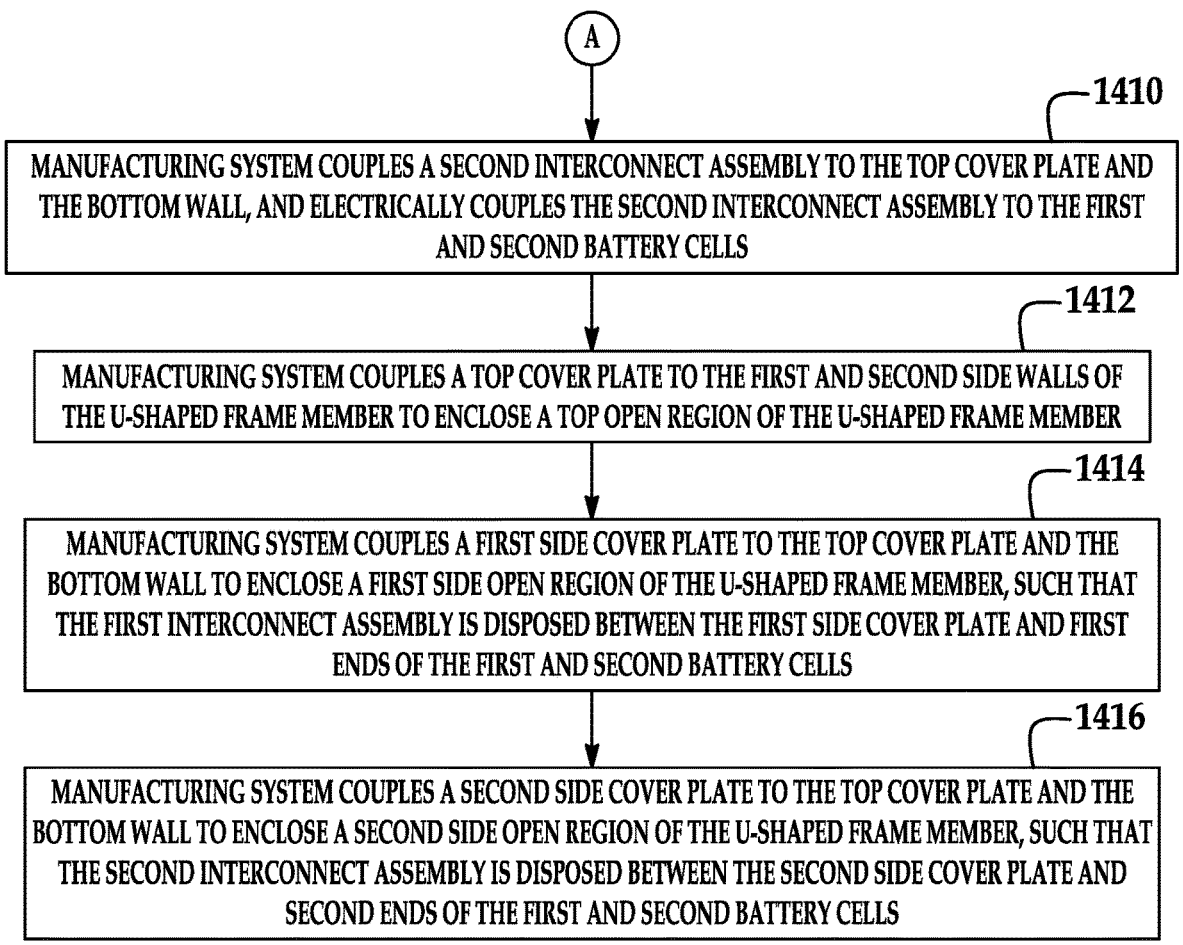

Referring to FIGS. 2, 26 and 27, the rectangular wall 1200 includes an aperture 1250 extending therethrough. The aperture 1250 is sized and shaped to receive the electrical connector 900 therethrough.

The bottom wall 1202 is coupled to a bottom end of the rectangular wall 1200 and extends in a first direction perpendicular to the wall 1200.

The top wall 1204 is coupled to a top end of the rectangular wall 1200 and extends in the first direction perpendicular to the wall 1200. Further, the top wall 1204 extends substantially parallel to the bottom wall 1202.

The side wall 1206 is coupled to a first side end of the rectangular wall 1200 and extends in the first direction perpendicular to the wall 1200. Further, the side wall 1206 is coupled to and extends between the bottom wall 1202 and the top wall 1204.

The side wall 1208 is coupled to a second side end of the rectangular wall 1200 and extends in the first direction perpendicular to the wall 1100. Further, the side wall 1208 is coupled to and extends between the bottom wall 1202 and the top wall 1204. Further, the side wall 1208 extends substantially parallel to the side wall 1206.

Figure 10:
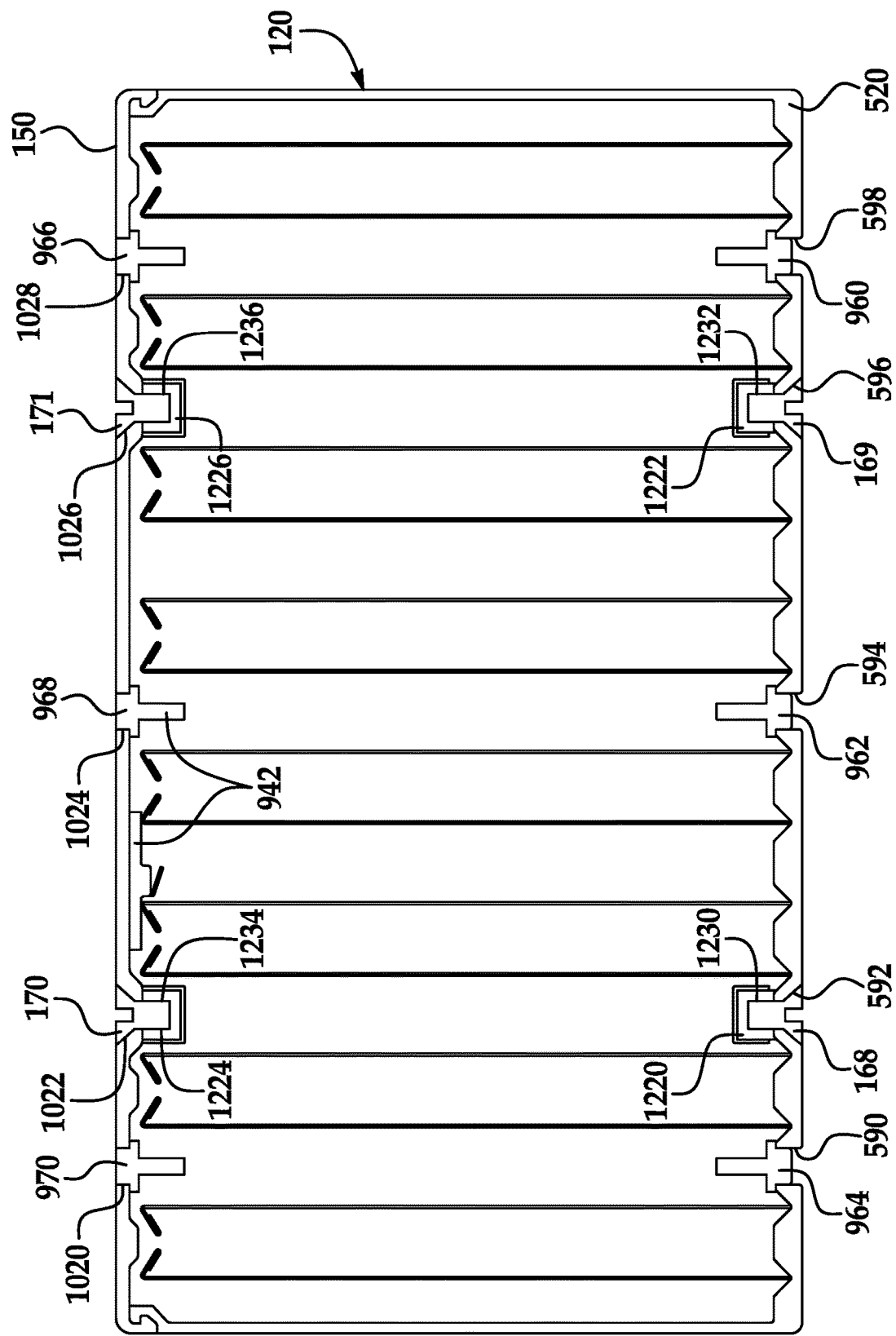
FIG. 10 is a cross-sectional view of the battery module of FIG. 1 taken along lines 10-10.
Figure 11:
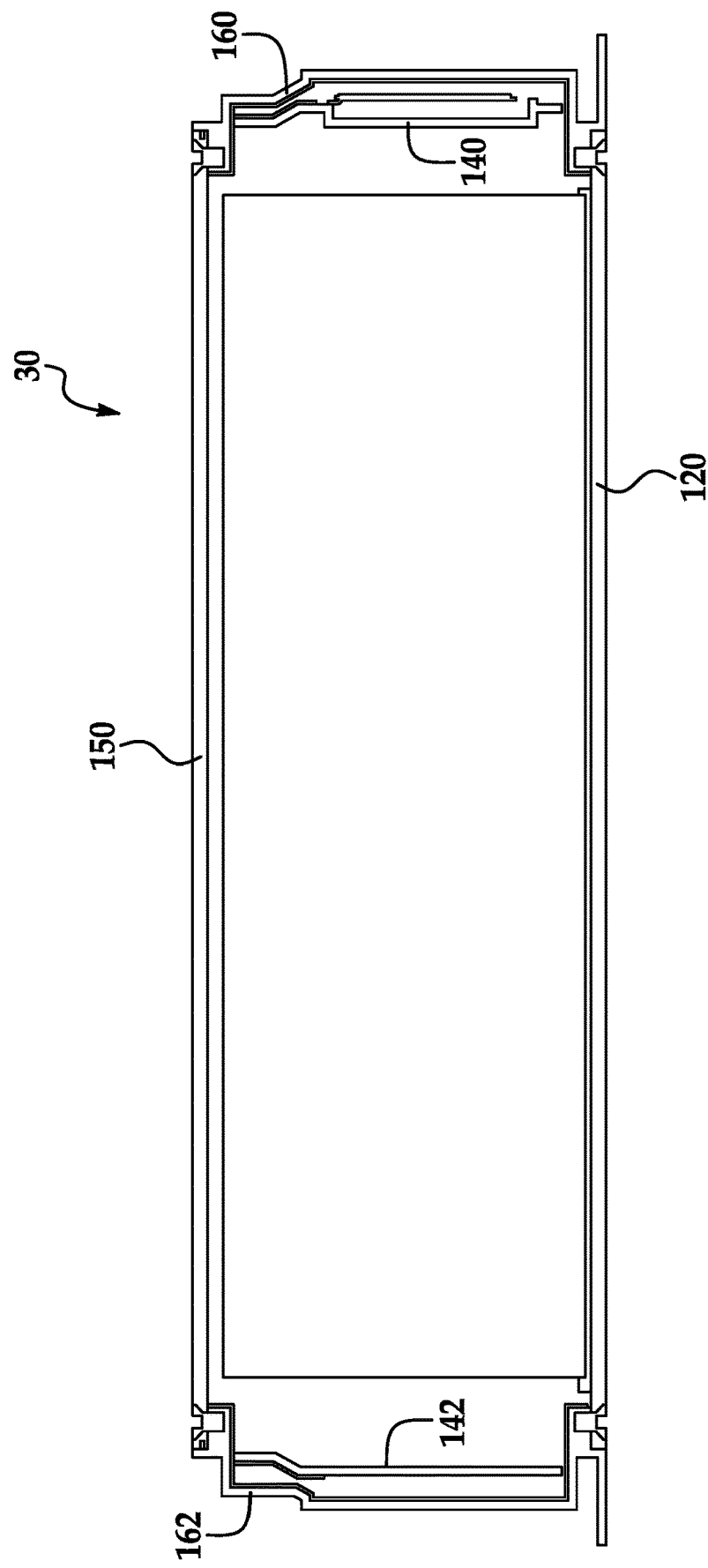
FIG. 11 is a cross-sectional view of the battery module of FIG. 2 taken along lines 11-11.
Figure 12:
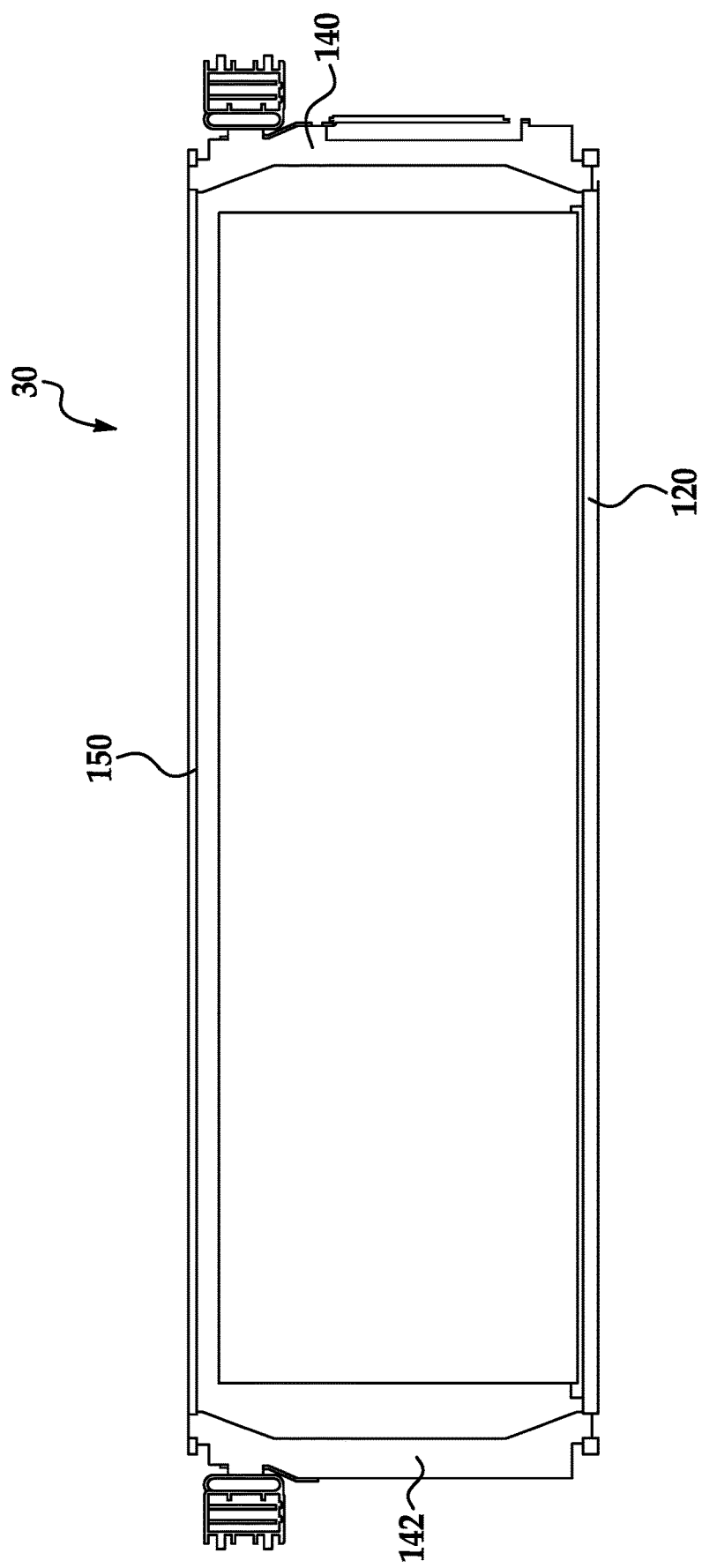
FIG. 12 is a cross-sectional view of the battery module of FIG. 2 taken along lines 12-12.
Figure 13:
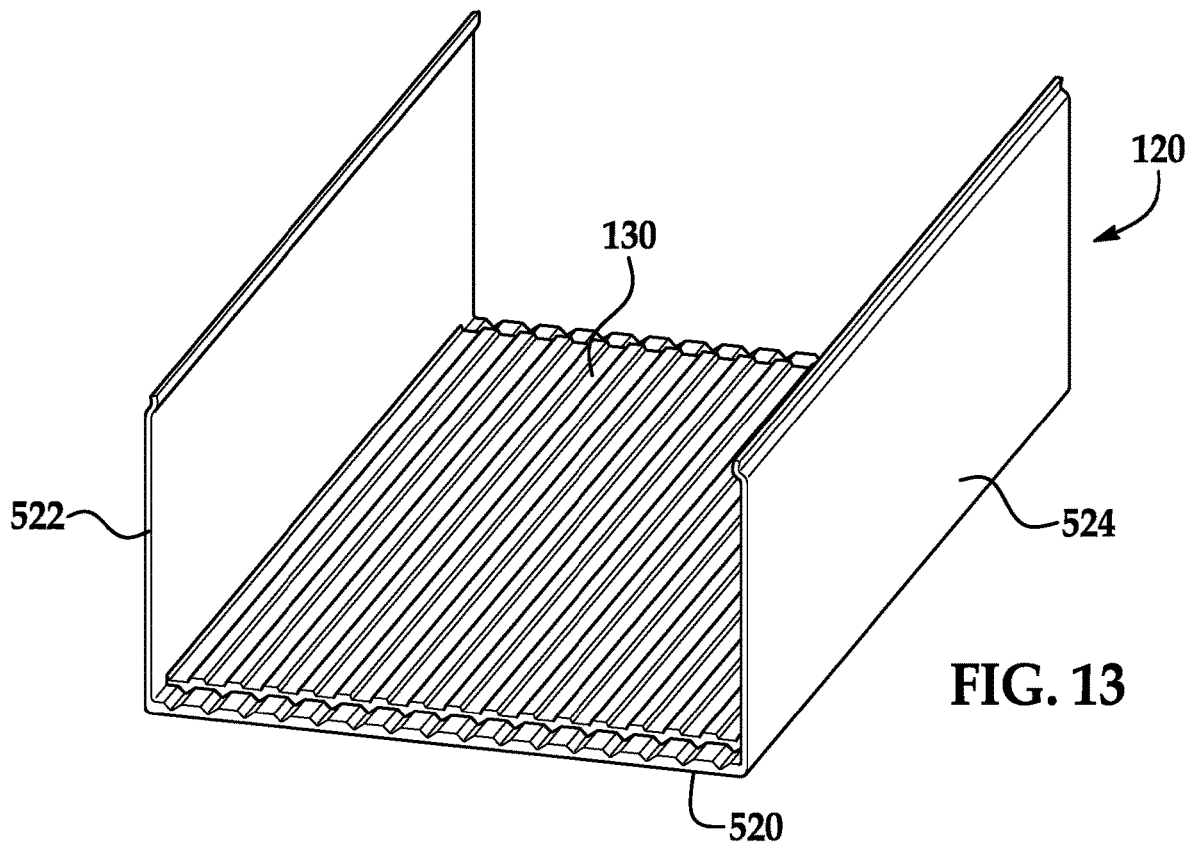
FIG. 13 is a schematic of a u-shaped frame member and a thermally conductive layer that are utilized in the battery module of FIG. 1.

Referring to FIGS. 10, 26 and 27, the bolt receiving member 1220 is coupled to and extends outwardly from the bottom wall 1202 in the first direction. The bolt receiving member 1220 includes an aperture 1230 extending therein. The bolt 168 extends through the aperture 592 in the bottom wall 520 of the u-shaped frame member 120 and into an aperture 1230 of the bolt receiving member 1220 to couple the side cover plate 162 to the u-shaped frame member 120.

The bolt receiving member 1222 is coupled to and extends outwardly from the bottom wall 1202 in the first direction. The bolt receiving member 1222 includes an aperture 1232 extending therein. The bolt 169 extends through the aperture 596 in the bottom wall 520 of the u-shaped frame member 120 and into an aperture 1232 of the bolt receiving member 1222 to couple the side cover plate 162 to the u-shaped frame member 120.

The bolt receiving member 1224 is coupled to and extends outwardly from the top wall 1204 in the first direction. The bolt receiving member 1224 includes an aperture 1234 extending therein. The bolt 170 extends through the aperture 1022 in the top cover plate 150 and into an aperture 1234 of the bolt receiving member 1224 to couple the side cover plate 162 to the top cover plate 150.

The bolt receiving member 1226 is coupled to and extends outwardly from the top wall 1204 in the first direction. The bolt receiving member 1226 includes an aperture 1236 extending therein. The bolt 171 extends through the aperture 1026 in the top cover plate 150 and into an aperture 1236 of the bolt receiving member 1226 to couple the side cover plate 162 to the top cover plate 150.

The mounting pads 1240, 1242 are coupled to and extend outwardly from the rectangular wall 1200 in a second direction. The mounting pads 1240, 1242 are utilized to couple the battery module 30 to the cooling plate 40 utilizing first and second bolts respectively.

Referring to FIGS. 28-38, a flowchart of a method of assembling the battery module 30 in accordance with another exemplary embodiment is provided. For purposes of simplicity, the method will be described utilizing two battery cells, although the battery cell stack (e.g., plurality of battery cells) shown in FIG. 28 could be utilized. In an exemplary embodiment, a manufacturing system 1500 is utilized to assemble the battery module 30. The manufacturing system 1500 can include at least one robot or manufacturing fixture to handle and move the battery cells 50, 52 and the other components of the battery module 30 to desired locations, and to assemble and couple the components of the battery module 30 together as described herein.

At step 1400, a manufacturing system 1500 (shown in FIG. 36) provides the battery cells 50, 52 (shown in FIG. 8). The battery cell 180 has a rectangular housing 180 with major side surfaces 185, 184, a bottom end portion 187, and a top end portion 189. The battery cell 52 has a rectangular housing 200 with major side surfaces 204, 205, a bottom end portion 207, and a top end portion 209. The battery cells 50, 52 are stacked on one another such that the major side surface 185 of the battery cell 50 is disposed against the major side surface 204 of the battery cell 52.

At step 1402, the manufacturing system 1500 provides a u-shaped frame member 120 having a bottom wall 520 and side walls 522, 524 coupled to the bottom wall 520 and extending upwardly from the bottom wall 520. The u-shaped frame member 120 defines an interior space 526 between the bottom wall 520 and the side walls 522, 524.

At step 1404, the manufacturing system 1500 disposes a thermally conductive layer 130 on the bottom wall 520 such that the thermally conductive layer 130 communicates with the interior space 526.

At step 1406, the manufacturing system 1500 disposes the battery cells 50, 52 in the interior space 526 such that the bottom end portion 187 of the battery cell 50 and the bottom end portion 207 of the battery cell 52 are disposed directly on the thermally conductive layer 130. The major side surfaces 185, 184, 224, 225 are disposed substantially perpendicular to the bottom wall 520.

At 1408, the manufacturing system 1500 couples an interconnect assembly 140 to the top cover plate 150 and the bottom wall 520, and electrically couples the interconnect assembly 140 to the battery cells 50, 52.

At step 1410, the manufacturing system 1500 couples an interconnect assembly 142 to the top cover plate 150 and the bottom wall 520, and electrically couples the interconnect assembly 142 to the battery cells 50, 52.

At step 1412, the manufacturing system 1500 couples the top cover plate 150 to the side walls 522, 524 of the u-shaped frame member 120 to enclose a top open region of the u-shaped frame member 120.

At step 1414, the manufacturing system 1500 couples a side cover plate 160 to the top cover plate 150 and the bottom wall 520 to enclose a first side open region of the u-shaped frame member 120, such that the interconnect assembly 140 is disposed between the side cover plate 160 and first ends of the battery cells 50, 52.

At step 1416, the manufacturing system 1500 couples a side cover plate 162 to the top cover plate 150 and the bottom wall 520 to enclose a second side open region of the u-shaped frame member 120, such that the interconnect assembly 142 is disposed between the side cover plate 162 and second ends of the battery cells 50, 52.

The battery module described herein provides a substantial advantage over other battery modules. In particular, the battery module is more easily assembled than other battery modules because the battery module utilizes a U-shaped frame member that more easily receives battery cells therein during assembly of the battery module, as compared to a box-shaped frame member having only a top open end.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:
a first battery cell having a first rectangular housing with a first bottom end portion;
a second battery cell having a second rectangular housing with a second bottom end portion;
the first and second battery cells being stacked on one another;
a u-shaped frame member having a bottom wall and first and second side walls coupled to the bottom wall that define an interior space that is sized and shaped to hold the first and second battery cells therein;
a thermally conductive layer being disposed on the bottom wall and communicating with the interior space;
the first and second battery cells being disposed in the interior space such that the first bottom end portion and the second bottom end portion are disposed directly on the thermally conductive layer;
a top cover plate being coupled to the first and second side walls of the u-shaped frame member to enclose a top open region of the u-shaped frame member;
a first interconnect assembly having first and second coupling tab members, the first coupling tab member extending into a first aperture in the top cover plate to couple the first interconnect assembly to the top cover plate, the second coupling tab member extending into a second aperture in the bottom wall of the u-shaped frame member to couple the first interconnect assembly to the bottom wall, the first interconnect assembly being electrically coupled to electrical terminals on a first end of the first and second battery cells for electrically coupling the first and second battery cells to one another; and
a first side cover plate being coupled to the top cover plate and the bottom wall to enclose a first side open region of the u-shaped frame member such that the first interconnect assembly is disposed in the interior space between the first side cover plate and the first end of the first and second battery cells.

2. The battery module of claim 1, further comprising a second interconnect assembly being disposed in the interior space between a second side cover plate and a second end of the first and second battery cells, the second interconnect assembly being coupled to the top cover plate and the bottom wall.

3. The battery module of claim 2, wherein the second interconnect assembly includes third and fourth coupling tab members, the third coupling tab member extending into a third aperture in the top cover plate to couple the second interconnect assembly to the top cover plate, the second coupling tab member extending into a fourth aperture in the bottom wall of the u-shaped frame member to couple the second interconnect assembly to the bottom wall.

4. The battery module of claim 1, wherein:
the first side cover plate having third and fourth apertures extending therethrough;

a first screw being disposed through a fifth aperture in the top cover plate and the third aperture in the first side cover plate to couple the top cover plate to the first side cover plate; and a second screw being disposed through a sixth aperture in the bottom wall of the u-shaped frame member and the fourth aperture in the first side cover plate to couple the u-shaped frame member to the first side cover plate.

5. The battery module of claim 1, wherein a longitudinal length of the u-shaped frame member is greater than a longitudinal length of the first rectangular housing of the first battery cell.

6. The battery module of claim 1, wherein the u-shaped frame member is an aluminum u-shaped frame member.

7. The battery module of claim 1, wherein the top cover plate is an aluminum top cover plate, and the first side cover plate is a first plastic side cover plate.

8. The battery module of claim 1, wherein the thermally conductive layer is a thermally conductive adhesive layer.

9. A method of assembling a battery module, comprising:
providing first and second battery cells, a top cover plate, and a first interconnect assembly, the first battery cell having a first rectangular housing with a first bottom end portion;
the second battery cell having a second rectangular housing with a second bottom end portion;
the first and second battery cells being stacked on one another;
providing a u-shaped frame member having a bottom wall and first and second side walls coupled to the bottom wall that define an interior space;
disposing a thermally conductive layer on the bottom wall such that the thermally conductive layer communicates with the interior space;
disposing the first and second battery cells in the interior space such that the first bottom end portion and the second bottom end portion are disposed directly on the thermally conductive layer;
electrically coupling the first interconnect assembly to electrical terminals on a first end of the first and second battery cells; the first interconnect assembly having first and second coupling tab members;
extending the first coupling tab member into a first aperture in the top cover plate to couple the first interconnect assembly to the top cover plate; and
extending the second coupling tab member into a second aperture in the bottom wall of the u-shaped frame member to couple the first interconnect assembly to the bottom wall.

10. The battery module of claim 1, wherein:
the first rectangular housing of the first battery cell having first and second major side surfaces;
the second rectangular housing of the second battery cell having third and fourth major side surfaces;
the first and second battery cells being stacked on one another such that the second major side surface of the first battery cell is disposed against the third major side surface of the second battery cell;
the first and second side walls of the u-shaped frame member extending upwardly from the bottom wall; and
the first, second, third, and fourth major side surfaces are disposed substantially perpendicular to the bottom wall.

11. The battery module of claim 1, further comprising:
a second side cover plate being coupled to the top cover plate and the bottom wall to enclose a second side open region of the u-shaped frame member.

12. The method of claim 9, wherein:
the first rectangular housing of the first battery cell having first and second major side surfaces;
the second rectangular housing of the second battery cell having third and fourth major side surfaces;
the first and second battery cells being stacked on one another such that the second major side surface of the first battery cell is disposed against the third major side surface of the second battery cell;
the first and second side walls of the u-shaped frame member extending upwardly from the bottom wall; and
the first, second, third, and fourth major side surfaces being disposed substantially perpendicular to the bottom wall.

13. The method of claim 9, further comprising:
coupling the top cover plate to the first and second side walls of the u-shaped frame member to enclose a top open region of the u-shaped frame member;
coupling a first side cover plate to the top cover plate and the bottom wall to enclose a first side open region of the u-shaped frame member such that the first interconnect assembly is disposed between the first side cover plate and the first end of the first and second battery cells; and
coupling a second side cover plate to the top cover plate and the bottom wall to enclose a second side open region of the u-shaped frame member.

\* \* \* \* \*